US011234134B2

(12) United States Patent
Chakraborty et al.

(10) Patent No.: US 11,234,134 B2
(45) Date of Patent: Jan. 25, 2022

(54) INITIAL NETWORK ACCESS FOR LICENSED SUPPLEMENTAL DOWNLINK PAIRED WITH UNLICENSED PRIMARY COMPONENT CARRIER

(71) Applicant: QUALCOMM Incorporated, San Diego, CA (US)

(72) Inventors: Kaushik Chakraborty, San Diego, CA (US); Xiaoxia Zhang, San Diego, CA (US); Srinivas Yerramalli, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 16/687,490

(22) Filed: Nov. 18, 2019

(65) Prior Publication Data

US 2020/0162931 A1 May 21, 2020

Related U.S. Application Data

(60) Provisional application No. 62/770,702, filed on Nov. 21, 2018.

(51) Int. Cl.
*H04W 16/14* (2009.01)
*H04W 48/10* (2009.01)
(Continued)

(52) U.S. Cl.
CPC ........... *H04W 16/14* (2013.01); *H04W 48/10* (2013.01); *H04W 48/16* (2013.01); *H04W 72/0453* (2013.01); *H04W 74/0833* (2013.01)

(58) Field of Classification Search
CPC . H04W 16/14; H04W 74/0833; H04W 48/16; H04W 72/0453; H04W 48/12; H04W 48/10
See application file for complete search history.

(56) References Cited

U.S. PATENT DOCUMENTS

2013/0163543 A1* 6/2013 Freda .................... H04W 16/14
370/329
2015/0049712 A1 2/2015 Chen et al.
(Continued)

OTHER PUBLICATIONS

Huawei, et al., "Scheduling Design for eLAA", 3GPP Draft, R1-160299, 3GPP TSG RAN WG1 Meeting #84 3rd Generation Partnership Project (3GPP), Mobile Competence Centre, 650, Route Des Lucioles, F-06921 Sophia-Antipolis Cedex, France vol. RAN WG1, No. St. Julian's, Malta, Feb. 15, 2016-Feb. 19, 2016, Feb. 14, 2016 (Feb. 14, 2016), XP051053639, 4 pages, Retrieved from the Internet: URL: http://www.3gpp.org/ftp/Meetings_3GPP_SYNC/RAN1/ Docs/, [retrieved on Feb. 14, 2016], Section 2.

(Continued)

*Primary Examiner* — Brian D Nguyen
(74) *Attorney, Agent, or Firm* — Liem T. Do

(57) ABSTRACT

Wireless communications systems and methods related to communications in a network that supports data transmitted in an unlicensed frequency band and a licensed frequency band are provided. A first wireless communication device communicates, with a second wireless communication device in a first frequency band, a first system information signal indicating a transmission configuration for a second system information signal in a second frequency band different from the first frequency band. The first wireless communication device communicates, with the second wireless communication device in the second frequency band, the second system information signal based on the transmission configuration.

30 Claims, 11 Drawing Sheets

(51) Int. Cl.
    *H04W 48/16*     (2009.01)
    *H04W 72/04*     (2009.01)
    *H04W 74/08*     (2009.01)

(56) References Cited

U.S. PATENT DOCUMENTS

| | | | |
|---|---|---|---|
| 2021/0007068 A1* | 1/2021 | Kim | H04L 5/0048 |
| 2021/0045144 A1* | 2/2021 | Kim | H04W 56/001 |
| 2021/0092779 A1* | 3/2021 | Tang | H04W 72/04 |
| 2021/0099332 A1* | 4/2021 | Berggren | H04J 11/0073 |
| 2021/0099998 A1* | 4/2021 | Babaei | H04W 72/042 |

OTHER PUBLICATIONS

International Search Report and Written Opinion—PCT/US2019/062233—ISAEPO—dated Feb. 25, 2020.

* cited by examiner

INITIAL NETWORK ACCESS FOR LICENSED SUPPLEMENTAL DOWNLINK PAIRED WITH UNLICENSED PRIMARY COMPONENT CARRIER

CROSS REFERENCE TO RELATED APPLICATIONS & PRIORITY CLAIM

The present application claims priority to and the benefit of the U.S. Provisional Patent Application No. 62/770,702 filed Nov. 21, 2018, which is hereby incorporated by reference in their entirety.

TECHNICAL FIELD

This application relates to wireless communication systems, and more particularly to communications in a network deployed over a licensed supplemental downlink (SDL) paired with an unlicensed primary component carrier.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR-unlicensed (NR-U) may refer to the deployment of a NR cell in an unlicensed spectrum. For example, a NR cell may be deployed in a standalone NR-U mode over one or more unlicensed frequency bands. NR-U may also support cell deployments using various combinations of unlicensed bands and licensed bands. For example, a NR cell may be deployed using carrier aggregation to combine a NR licensed band with a NR unlicensed band, where the NR licensed band may function as an anchor carrier or a primary cell (PCell) and the unlicensed band may function as a supplemental carrier or a secondary cell (SCell). The SCell may include an uplink (UL) component carrier and a downlink (DL) component carrier. Alternatively, the SCell may include a DL component carrier only. In another example, a NR cell may be deployed using dual connectivity between an LTE licensed band and a NR unlicensed band, where the LTE licensed band may function as a PCell and the NR unlicensed band may function as a SCell. In yet another example, a NR cell may be deployed in a DL unlicensed band and a UL licensed band.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device in a first frequency band, a first system information signal indicating a transmission configuration for a second system information signal in a second frequency band different from the first frequency band; and communicating, by the first wireless communication device with the second wireless communication device in the second frequency band, the second system information signal based on the transmission configuration.

In an additional aspect of the disclosure, an apparatus includes a transceiver configured to communicate, by a first wireless communication device with a second wireless communication device in a first frequency band, a first system information signal indicating a transmission configuration for a second system information signal in a second frequency band different from the first frequency band; and further configured to communicate, by the first wireless communication device with the second wireless communication device in the second frequency band, the second system information signal based on the transmission configuration.

In an additional aspect of the disclosure, a computer-readable medium includes program code recorded thereon, the program code including code for causing a first wireless communication device to communicate, with a second wireless communication device in a first frequency band, a first system information signal indicating a transmission configuration for a second system information signal in a second frequency band different from the first frequency band; and code for causing the first wireless communication device to communicate, with the second wireless communication device in the second frequency band, the second system information signal based on the transmission configuration.

In an additional aspect of the disclosure, an apparatus includes means for communicating, with a second wireless communication device in a first frequency band, a first system information signal indicating a transmission configuration for a second system information signal in a second frequency band different from the first frequency band; and means for communicating, with the second wireless communication device in the second frequency band, the second system information signal based on the transmission configuration.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
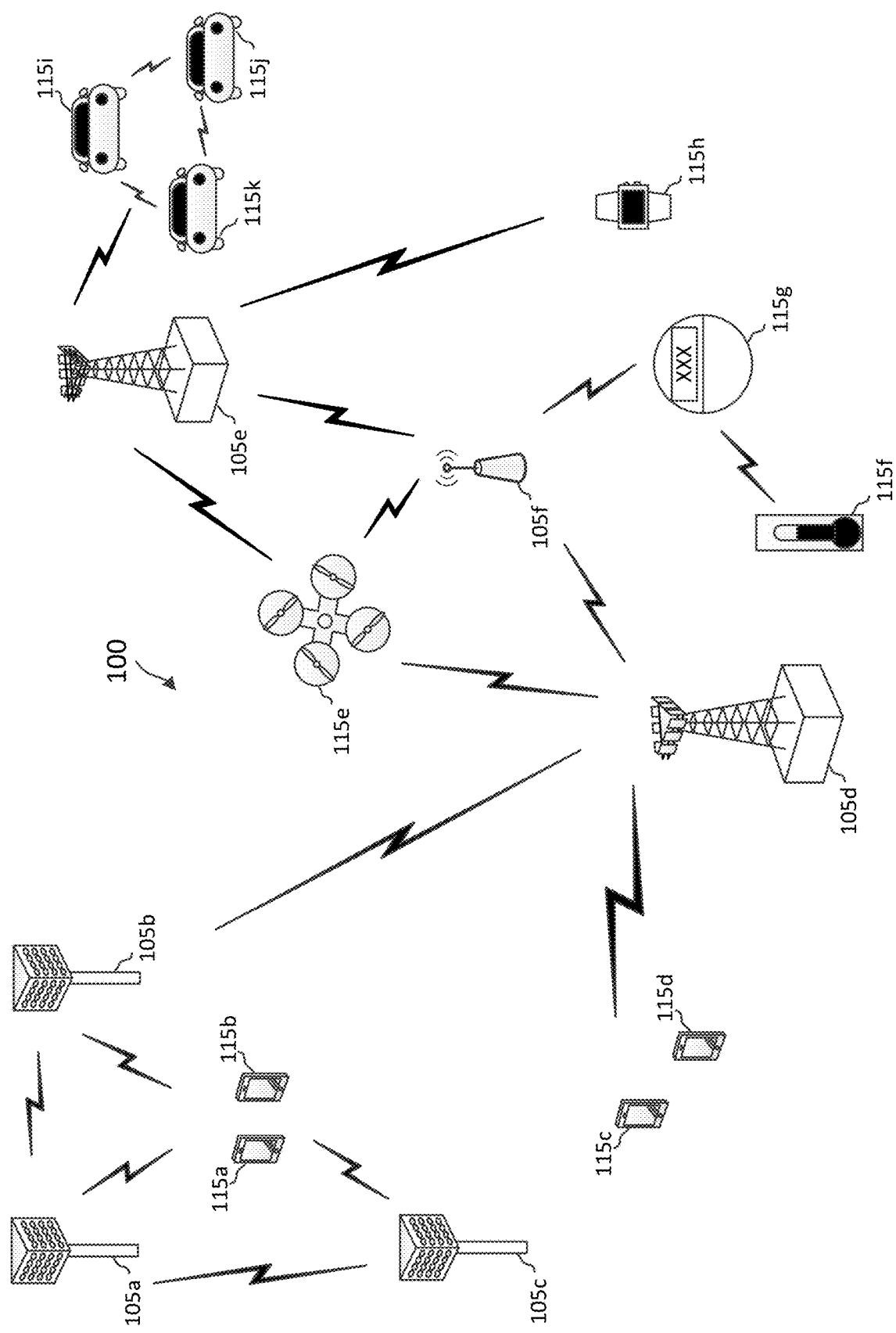
FIG. 1 illustrates a wireless communication network according to one or more embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). The "3rd Generation Partnership Project" (3GPP) Long Term Evolution (LTE) and LTE-Advanced (LTE-A) are new releases of UMTS that use E-UTRA. UTRA, E-UTRA, UMTS, LTE, LTE-A and GSM are described in documents from an organization named the "3rd Generation Partnership Project." CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G)) network. The 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

In an embodiment, the network 100 may operate over shared frequency bands or unlicensed frequency bands, for example, at about 3.5 gigahertz (GHz), sub-6 GHz or higher frequencies in the mmWave band. Operations in unlicensed spectrum may include DL transmissions and/or UL transmissions. The network 100 may partition a frequency band into multiple channels or subbands, for example, each occupying about 20 megahertz (MHz).

The present application describes mechanisms for improving communications between wireless devices by utilizing a SDL licensed band paired with an unlicensed band. A wireless communications system may support downlink (DL) transmissions by a BS when operating in unlicensed spectrum and/or licensed spectrum. In some examples, carrier aggregation may involve aggregation of a first component carrier with a second component carrier for facilitation of communications between the BS and a UE. In an example, the first component carrier is a sub-6 GHz and the second component carrier is in the mmWave frequency band. The BS may transmit an anchor signal in both the first and second DL component carriers, and the primary DL component carrier may be dynamically selected depending on coverage by the two DL component carriers. As discussed in more detail below, the BS may leverage a NDL unlicensed band and/or a SDL licensed band as a cross-carrier frequency indication channel providing information to the UE to more easily access signals on the other DL carrier.

In the present disclosure, the terms "non-SDL carrier," "primary DL carrier," "normal DL (NDL) carrier," "DL unlicensed band," and "unlicensed frequency band" may be used interchangeably. Additionally, the terms "supplemental DL (SDL) carrier," "SDL licensed band" and "licensed frequency band" may be used interchangeably.

FIG. 1 illustrates a wireless communications network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-

105c may be macro BSs enabled with one of 3 dimension (3D), full dimension (FD), or massive Multiple Input-Multiple Output (MIMO). The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/frequency-division duplexing (FDD) communications, such as in a vehicle-to-vehicle (V2V) communication.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of transmission time intervals (TTIs) may be scalable.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than DL communication.

The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. After establishing the connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

Figure 2:
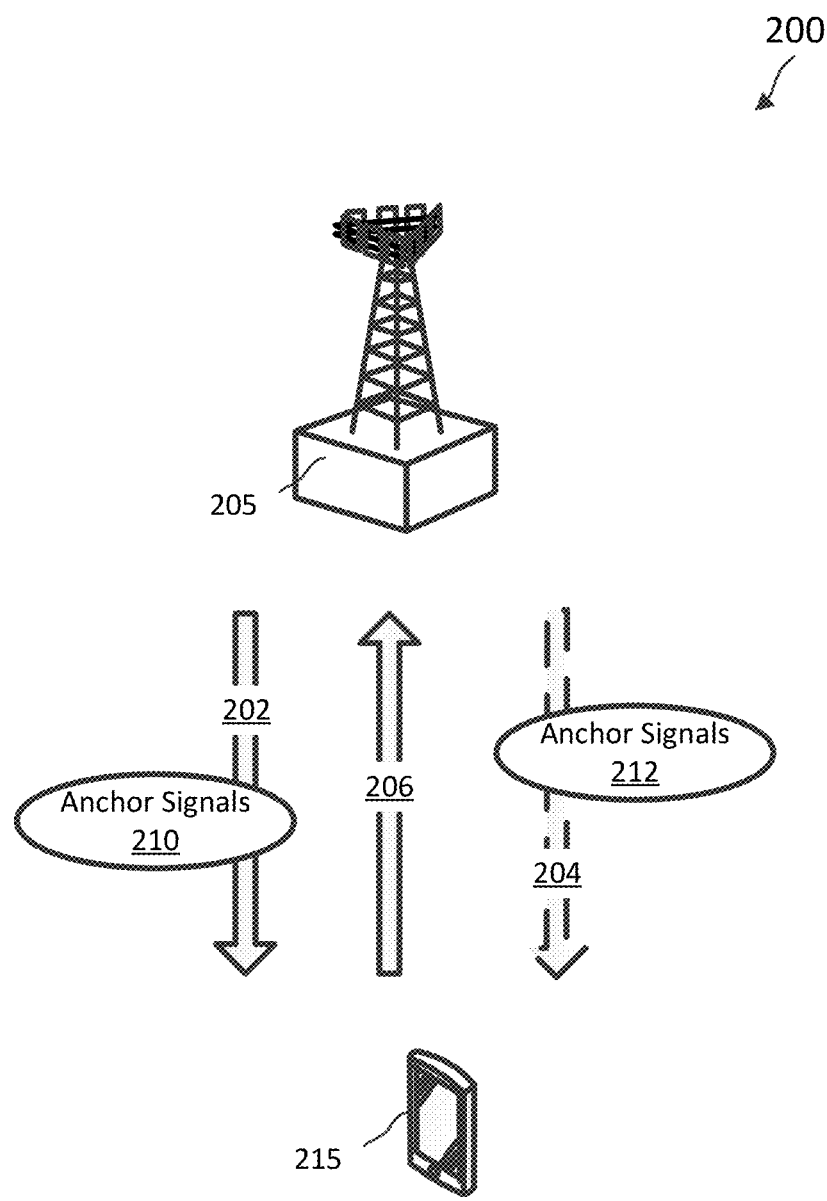
FIG. 2 illustrates a wireless communications network that supports a licensed supplemental downlink (SDL) carrier in addition to an unlicensed uplink (UL) and/or downlink (DL) carrier according to one or more embodiments of the present disclosure.

In an embodiment, the network 100 may be a NR network deployed over a licensed spectrum and/or an unlicensed spectrum. FIG. 2 illustrates a wireless communications network 200 that supports a licensed SDL carrier in addition to an unlicensed UL and/or DL carrier according to one or more embodiments of the present disclosure. FIG. 2 illustrates a BS 205 and a UE 215 for purposes of simplicity of discussion, though it will be recognized that embodiments of the present disclosure may scale to many more BSs 205 and/or UEs 215. The BS 205 and the UE 215 may be similar to the BS 105 and the UE 115, respectively. Additionally, wireless communications system 200 may operate in unlicensed spectrum that may also be used by other wireless communication devices.

The wireless communications system 200 provides for a non-standalone mode in NR by supporting both a normal DL (NDL) unlicensed band 202 and a UL unlicensed band 206, which utilize unlicensed spectrum, and a SDL licensed band 204, which utilizes the licensed spectrum. An operator may have the SDL licensed band 204 but not a corresponding UL licensed band. In some examples, DL and UL communications may both be on the same unlicensed band (TDD). For FDD systems, DL and UL may be on separate bands. In the present disclosure, the terms "NDL," "DL unlicensed carrier," "NDL carrier," "DL unlicensed band," and "unlicensed DL frequency band" may be used interchangeably. Additionally, the terms "SDL," "DL licensed carrier," "SDL carrier," "DL licensed band" and "licensed DL frequency band" may be used interchangeably.

The BSs 205 and the UEs 215 may be operated by multiple network operating entities sharing resources in the shared or unlicensed frequency spectrum and may perform a LBT procedure (e.g., clear channel assessment (CCA)) prior to communicating to determine whether the channel is available. In an example, the BS 205 may employ a LBT procedure to reserve transmission opportunities (TXOPs) in the shared medium for communications. TXOPs may be non-continuous in time and may refer to an amount of time a station can send frames when it has won contention for the wireless medium. Each TXOP may include a plurality of slots and one or more medium sensing periods. The BS 205 may perform a LBT in the frequency band prior to transmitting in the frequency band and may transmit in one or more channels based on the LBT result. If the channel is available (performance of the LBT results in a LBT pass), the BS 205 may perform a DL transmission, receive a UL transmission from the UE 215, and/or schedule the UE 215 for data transmission and/or reception within a TXOP. If the channel is not available (performance of the LBT results in a LBT fail), the BS 205 may back off and perform the LBT procedure again at a later point in time.

Additionally, the BS 205 may operate in a licensed frequency band, without contending for access to the medium. The BS 205's access to the licensed frequency band may be more consistent and certain relative to accessing the unlicensed frequency band.

The wireless communications system 200 supports DL transmissions by the BS 205 when operating in unlicensed spectrum via the NDL unlicensed band 202 and/or licensed spectrum via the SDL licensed band 204. It may be advantageous for the BS 205 to use both the licensed frequency band and the unlicensed frequency band for DL transmissions to the UE 215. In some examples, the BS transmits synchronization signals to allow UEs to search and acquire synchronization to a cell within the radio access network. In an example, the BS 205 transmits anchor signals 210 in the NDL unlicensed band 202 and transmits anchor signals 212 in the SDL licensed band 204. The anchor signals 210, 212 may include synchronization signals (e.g., PSS and SSS) and broadcast system information (e.g., PBCH), as will be discussed in more detail below. In some instances, the PSS, SSS, and PBCH signals may be transmitted in the form of SSBs. The wireless communications system 200 provides flexibility because either of the NDL unlicensed band 202 or the SDL licensed band 204 may function as the anchor DL component carrier. The initial access procedures may be defined with respect to the anchor component carrier. The UE may search in the NDL unlicensed band 202 or the SDL licensed band 204 for the anchor signals, and the primary DL carrier may be dynamically selected based on the coverage of the respective signals.

In some examples, the BS uses only one DL band (e.g., SDL or NDL) as a cross-carrier frequency indication channel. In an example, the SDL licensed band 204, but not the NDL unlicensed band 202, includes an indication of the location of one or more SSBs on the unlicensed DL carrier. Such a deployment may be useful if a UE does not initially search for unlicensed spectrum. In some examples, the BS leverages each of the NDL unlicensed band 202 and the SDL licensed band 204 as a cross-carrier frequency indication channel. In an example, the indication channel provides a first system information signal indicating a transmission configuration for a second system information signal that is transmitted in the other channel. In an example, the NDL unlicensed band 202 is in the sub-6 GHz frequency band, and the SDL licensed band 204 is in the mmWave frequency band. Some UEs may benefit from operating in the mmWave frequency band for their anchor signals, and some other UEs may benefit from operating in the unlicensed band for their anchor signals. Communications in the mmWave frequency band may have a high path-loss, and thus may have a smaller coverage than in the NDL unlicensed band 202. Accordingly, an advantage of using the NDL unlicensed band 202 as the anchor DL component carrier may provide for larger coverage overall. For example, if a large number of UEs 215 are using anchor signals in the SDL licensed band 204, there would be smaller coverage overall. Additionally, performance in the SDL licensed band 204 may be sensitive to beam management.

An advantage of using the SDL licensed band 204 as the anchor DL component carrier may mitigate the randomness caused by performing LBT for channel access. For example, when operating in the SDL licensed band 204, the BS may schedule data transmission on a more consistent basis utilizing the licensed frequency band because it is unnecessary for the BS to contend for the licensed medium. In contrast, access to the NDL unlicensed band 202 may be gated by LBT. For example, if a large number of UEs 215 are using anchor signals in the NDL unlicensed band 202, the initial access procedure may be more complex because the UE 215 may monitor for a longer period of time due to the unlicensed nature of the unlicensed band.

FIGS. 3-8 illustrate various mechanisms for communicating in a first frequency band, a first system information signal indicating a transmission configuration for a second system information signal in a second frequency band different from the first frequency band according to one or more embodiments of the present disclosure. In FIGS. 3-8, the communication schemes 300, 500, and 700 and transmission configurations 400, 600, 800 may be employed by BSs such as the BSs 105, 205 and UEs such as the UEs 115 and 215 in a network such as the network 100, 200.

Figure 3:
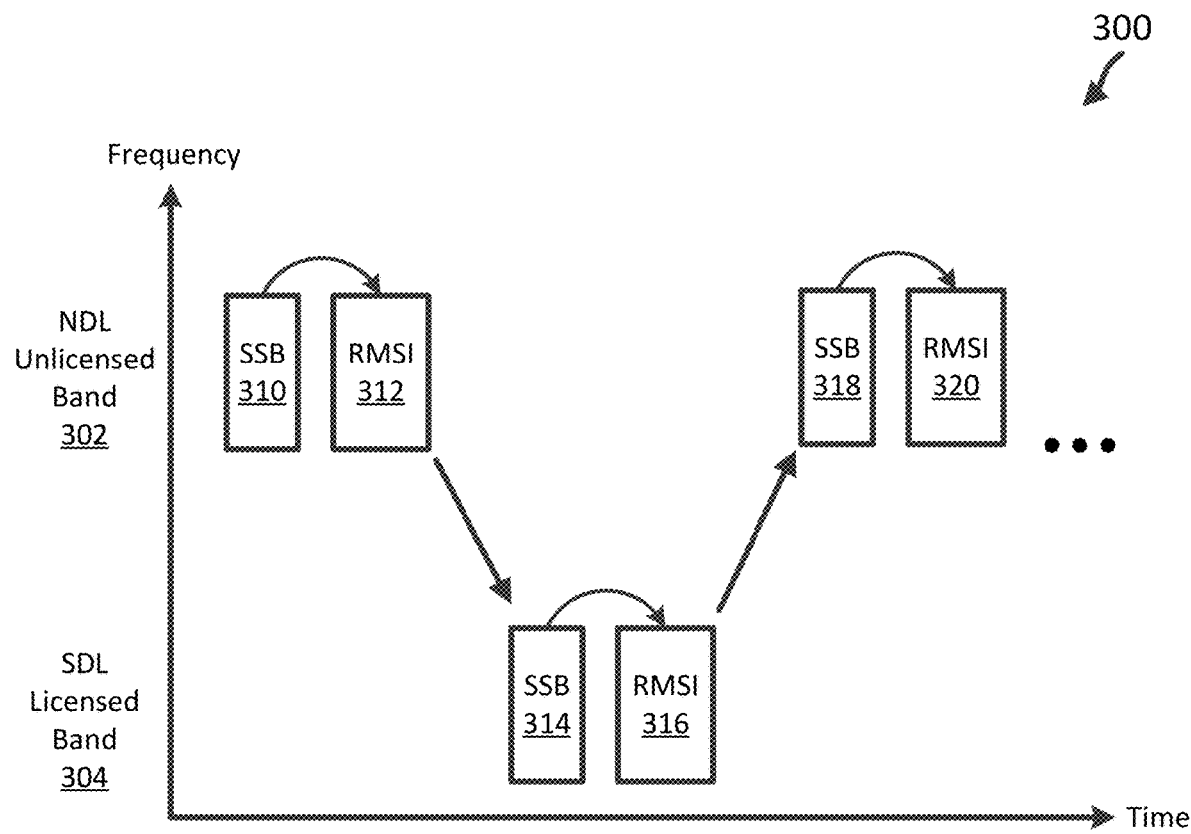
FIG. 3 illustrates a communication scheme for communicating system information signals using a cross-carrier frequency indication according to one or more embodiments of the present disclosure.

FIG. 3 illustrates a communication scheme 300 for communicating system information signals using a cross-carrier frequency indication according to one or more embodiments of the present disclosure. The x-axis represents time in some constant units, and the y-axis represents frequency in some constant units. The scheme 300 may be employed by BSs such as the BSs 105, 205 or by UEs such as the UEs 115, 215 in a network such as the network 100, 200. The scheme 300 illustrates transmission of anchor signals (e.g., SSBs) in both a NDL unlicensed band 302 and a SDL licensed band 304. The UE may receive the anchor signals in the NDL unlicensed band 302 and the SDL licensed band 304 use either for its primary DL carrier. In an example, the SDL licensed band 304 may be located at frequencies above 6 GHz, and the normal DL unlicensed band 302 may be located at frequencies of about sub-6 GHz. It should be understood that although examples may describe the SDL licensed band 304 as being in the mmWave frequency band, the SDL licensed band 304 may operate in other frequency bands (e.g., at about 3.5 gigahertz (GHz) or sub-6 GHz) as well.

During cell acquisition, the BS may perform discovery signal transmission by transmitting one or more SSBs in a SS burst. The SS burst may include a number of SSBs, each SSB transmitted over a given beam. Each SSB may carry information including a PSS, a SSS, a PBCH signal, an SSB index for the SSB, and/or any discovery related reference signals. In some examples, the BS provides within a SSB and a corresponding RMSI in the NDL unlicensed band 302 frequency information regarding the SDL licensed band 304 to enable the UE to search for SSB locations in the SDL licensed band 304 and/or provides within a SSB and a corresponding RMSI in the SDL licensed band 304 frequency information regarding the NDL unlicensed band 302 to enable the UE to search for SSB locations in the NDL unlicensed band 302.

In the example illustrated in FIG. 3, the same cell may have two DL carriers for sending separate SSBs and their corresponding RMSI. A RMSI in a first frequency band may provide a cross-carrier indication of a location of SSBs in another frequency band. The BS assists the UE to find anchor signals in the other carrier via a cross-carrier indication signal. The BS transmits a SSB 310 and a system information signal including a RMSI 312 in the NDL unlicensed band 302. The SSB 310 includes a PBCH signal that provides a location (e.g., a time-frequency resource) of the corresponding RMSI 312 in the NDL unlicensed band 302. The UE receives in the NDL unlicensed band 302, the SSB 310 and accordingly is informed of the location and/or scheduling information of the corresponding RMSI 312. The RMSI 312 may be leveraged to indicate a transmission configuration for a system information signal (e.g., SSB 314 or the RMSI 316) in the SDL licensed band 304. The transmission configuration provides information to the UE about the location of other SSBs in the SDL licensed band 304. The transmission configuration in the NDL unlicensed band 302 may include, for example, at least one of a frequency for the SDL licensed band 304, an indication of whether transmission of the SSBs in the NDL unlicensed band and the SDL licensed band are synchronous or asynchronous, a timing offset between SSBs on the two frequency bands, or beam indices and/or a number of beams applied in relation to the SSBs in the SDL licensed band 304.

The BS transmits a SSB 314 and a system information signal including a RMSI 316 in the SDL licensed band 304. The SSB 314 includes a PBCH signal that provides a location (e.g., a time-frequency resource) of the corresponding RMSI 316 in the SDL licensed band 304. The UE receives in the SDL licensed band 304, the SSB 314 and accordingly is informed of the location and/or scheduling information of the corresponding RMSI 316. The RMSI 316 may be leveraged to indicate a transmission configuration for a system information signal (e.g., SSB 318 or the RMSI 320) in the NDL unlicensed band 302. The transmission configuration provides information to the UE about the location of other SSBs in the NDL unlicensed band 302. The transmission configuration in the SDL licensed band 304 may include, for example, at least one of a frequency for the NDL unlicensed band 302, an indication of whether transmission of the SSBs in the NDL unlicensed band and the SDL licensed band are synchronous or asynchronous, a timing offset between SSBs on the two frequency bands, or beam indices and/or a number of beams applied in relation to the SSBs in the NDL unlicensed band 302.

The BS transmits a SSB 318 and a system information signal including a RMSI 320 in the NDL unlicensed band 302. The SSB 318 includes a PBCH signal that provides a location (e.g., a time-frequency resource) of the corresponding RMSI 320 in the NDL unlicensed band 302. In some examples, the RMSI transmitted in the NDL unlicensed band 302 indicates a transmission configuration for a system information signal in the SDL licensed band 304, but the RMSI transmitted in the SDL licensed band 304 does not indicate a transmission configuration for a system information signal in the NDL unlicensed band 302. In some examples, the RMSI transmitted in the SDL licensed band 304 indicates a transmission configuration for a system information signal in the NDL unlicensed band 302, but the RMSI transmitted in the NDL unlicensed band 302 does not indicate a transmission configuration for a system information signal in the SDL licensed band 304. In some examples, the RMSI transmitted in the NDL unlicensed band 302 indicates a transmission configuration for a system information signal in the SDL licensed band 304, and the RMSI transmitted in the SDL licensed band 304 indicates a transmission configuration for a system information signal in the NDL unlicensed band 302.

During the initial search, the UE may detect either the SSB 310 in the NDL unlicensed band 302 or the SSB 314 in the SDL licensed band 304 first. The UE can perform a random access procedure to establish a connection with the BS using the NDL unlicensed band 302 or the SDL licensed band 304. Based on coverage by the two frequency bands, the UE may dynamically select one of the NDL unlicensed band 302 or the SDL licensed band 304 as the anchor DL component carrier. The BS's transmission of anchor signals in both the NDL unlicensed band 302 and SDL licensed band 304 may cause the UE's search for SSBs to be simplified and the network load balanced. In an example, the UE may receive the RMSI 312 and be able to more easily find the SSB 314 in the SDL licensed band 304. In another example, the UE may receive the RMSI 316 and be able to more easily find the SSB 318 in the NDL unlicensed band 302.

It should be understood that each of the NDL unlicensed band 302 and the SDL licensed band 304 can be in any suitable frequencies. In an example, the NDL unlicensed band 302 is in the sub-6 GHz frequency band, and the SDL licensed band 304 is in the mmWave frequency band. In another example, the NDL unlicensed band 302 and the SDL licensed band 304 are in the mmWave frequency band. If the UE scans the NDL unlicensed band 302 and detects the SSB 310 and the RMSI 312, the UE receives an indication of the location of the SSB 314 in the SDL licensed band 304. If the SDL licensed band 304 is overloaded with a large number of UEs and at least some of the UEs are within good coverage by the mmWave frequency band, it may be advantageous for at least some of these UEs to use the SDL licensed band 304 as the anchor DL component carrier.

In another example, if the UE scans the SDL licensed band 304 and detects the SSB 314 and the RMSI 316, the UE may be more power efficient using the SDL licensed band 304. If the UE is operating in a network such as network 200, which provides for a non-standalone mode by supporting both a NDL unlicensed band, a UL unlicensed band, and a SDL licensed band, the UE may find the UL frequency band by first searching for the NDL unlicensed band 302. The RMSI 316 in the SDL licensed band 304 provides an indication of the location of the SSB 318 in the NDL unlicensed band 302. The UE may start its search for a normal UL (NUL) frequency band (not shown) based on finding the NDL unlicensed band 302. The UE's search process for the NUL frequency band may be less complex because the UE can zoom into the corresponding frequency and time resources of the NUL frequency band via the location of the SSB 318 in the NDL unlicensed band 302. Additionally, the search time latency may be reduced.

Figure 4:
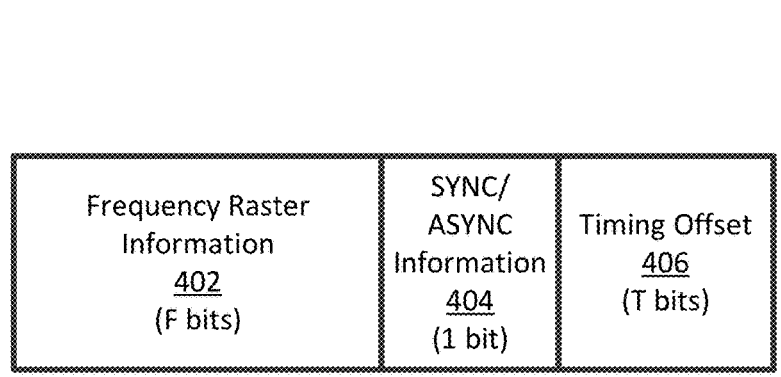
FIG. 4 illustrates a transmission configuration scheme according to one or more embodiments of the present disclosure.

As discussed, the RMSI transmitted in a frequency band may include a transmission configuration for a system information signal in a different frequency band. FIG. 4 illustrates a transmission configuration scheme 400 according to one or more embodiments of the present disclosure. In the example illustrated in FIG. 4, the transmission configuration scheme 400 includes frequency raster information 402, a SYNC/ASYNC indicator 404, and a timing offset 406. Each of the frequency raster information 402, the SYNC/ASYNC indicator 404, and the timing offset 406 may be conveyed using a number of bits according to desired granularity or coarseness.

The frequency raster information 402 is conveyed using "F" bits, where F is a number greater than one. Frequency raster information 402 may include the partitioning of a frequency band into channels and information (e.g., such as channel bandwidth, center frequency, and separation between channels, etc.). In an example, if the BS transmits the frequency raster information 402 in the NDL unlicensed band, the frequency raster information 402 refers to the frequency raster location for the SDL licensed band. In this example, the UE receives the frequency raster information 402, which provides the UE with frequency domain information regarding where the SDL licensed band is located. In another example, if the BS transmits the frequency raster information 402 in the SDL licensed band, the frequency raster information 402 refers to the frequency raster location for the NDL unlicensed band. In this example, the UE receives the frequency raster information 402, which provides the UE with frequency domain information regarding the NDL unlicensed band. The UE may then monitor the frequency channels (e.g., SDL licensed band or NDL unlicensed band) for SSBs.

In an example, frequency raster information 402 includes 15-22 bits. The number of "F" bits used for conveying the frequency raster information 402 may be based on, for example, an Absolute Radio-Frequency Channel Number (ARFCN) parameter and/or a Global Synchronization Raster Channel (GSCN). The ARFCN is a code that specifies the pair of reference frequencies used for transmission and reception in a radio system. In a FDD system, the DL and UL frequencies are different. Accordingly, one ARFCN number is used for DL and another ARFCN number is used for UL. In a TDD system, one ARFCN number is sufficient because the DL and UL frequencies remain the same. Additionally, the ARFCN has a 60-kHz separation for the mmWave frequency band, and accordingly has finer granularity compared to the GSCN. Accordingly, more bits may be used for the ARFCN representation compared to the GSCN.

The SYNC/ASYNC indicator 404 provides an indication of whether transmission of the SSBs in the NDL unlicensed band and the SDL licensed band are synchronous or asynchronous. In an example, the SYNC/ASYNC indicator 404 is conveyed using one bit. If the NDL unlicensed band and the SDL licensed band are asynchronous, the BS does not transmit the SSBs in these two frequency bands in accordance with a timing alignment between the frame structures. In other words, transmissions of the SSBs from the BS in the NDL unlicensed band and the SDL licensed band may have different notion of frame timing and are not aligned in time. If the NDL unlicensed band and the SDL licensed band are synchronous, the BS transmits the SSBs in these two frequency bands in accordance with a timing alignment between the frame structures. In other words, transmissions from the BS in the NDL unlicensed band and the SDL licensed band are approximately aligned in time.

If the NDL unlicensed band and the SDL licensed band are synchronous, the transmission configuration may also include the timing offset 406 between SSBs on the two frequency bands. The transmission of SSBs and their locations in a frequency band are defined a priori. The timing offset 406 is conveyed using "T" bits and provides additional information regarding the timing between the SSB transmissions in the frequency bands, where T is a number greater than one. The number of "T" bits used for defining the timing offset 406 may depend on the desired granularity. For example, the timing offset 406 may be specified at the symbol level or micro-slot level. The NDL unlicensed band is still subject to medium access contention. If the NDL licensed band and the SDL licensed band are synchronous, timing uncertainty may exist because the transmission of SSBs in the NDL unlicensed band may be delayed due to a LBT fail. Accordingly, it may be undesirable to have a very fine granularity for the timing offset 406. In an example, the timing offset 406 is represented using a few number of bits (e.g., 2-10).

Figure 5:
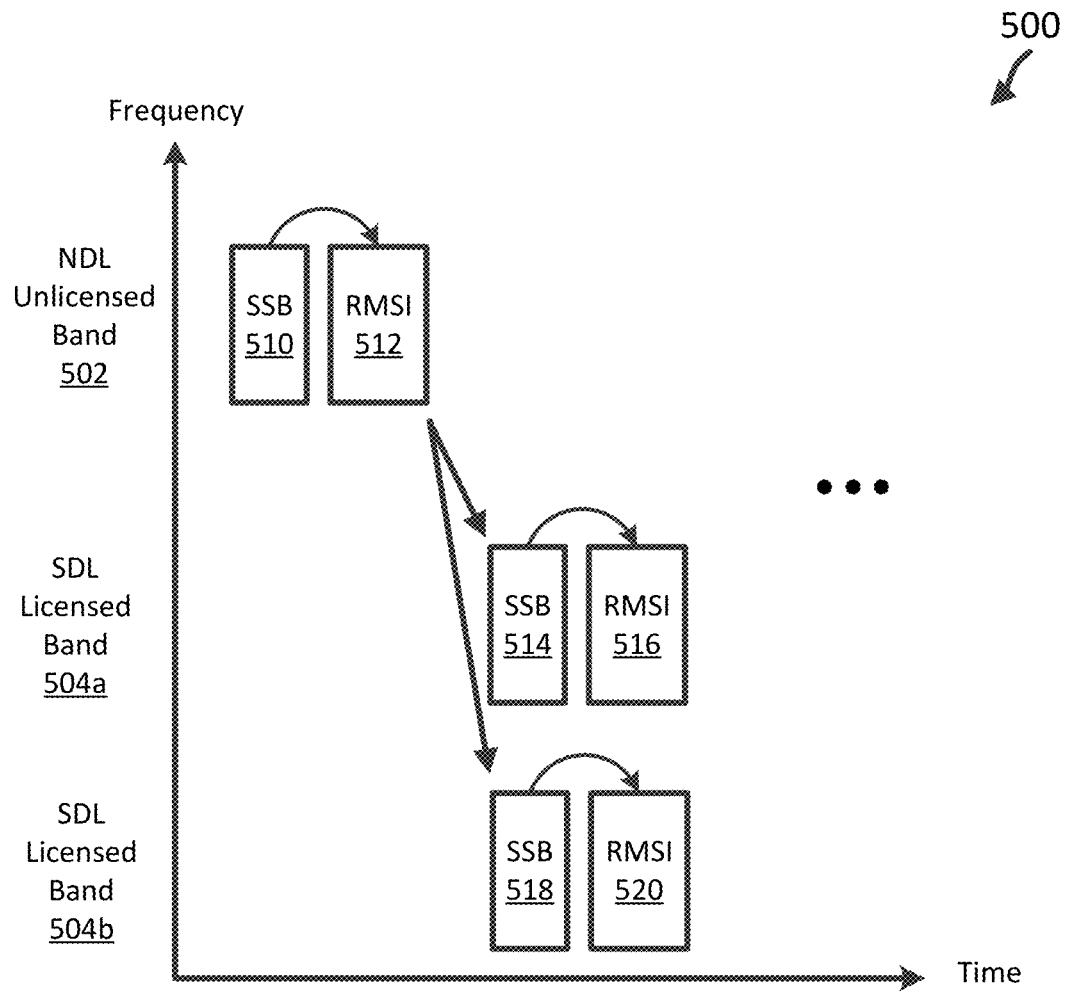
FIG. 5 illustrates a communication scheme for a single new radio (NR) cell that supports a plurality of SDL licensed bands with different frequency raster according to one or more embodiments of the present disclosure.

A BS may support one or multiple (e.g., two, three, four, and the like) cells, and a plurality of SDL licensed bands may be associated with a single NDL unlicensed band. In some examples, a single NR cell supports a plurality of SDL licensed bands (e.g., or subbands), which may in the mmWave frequency bands (or sub-bands) with different frequency raster. FIG. 5 illustrates a communication scheme 500 for a single NR cell that supports a plurality of SDL licensed bands with different frequency raster according to one or more embodiments of the present disclosure. The x-axis represents time in some constant units, and the y-axis represents frequency in some constant units. The scheme 500 may be employed by BSs such as the BSs 105, 205 or by UEs such as the UEs 115, 215 in a network such as the network 100, 200.

The scheme 500 illustrates transmission of anchor signals (e.g., SSBs) in a plurality of SDL licensed bands 504a and 504b corresponding to a single NDL unlicensed band 502. In an example referring to FIGS. 3 and 5, the SDL licensed band 304 may be partitioned into the plurality of SDL licensed bands 504a and 504b. The plurality of SDL licensed bands 504a and 504b may be supported by a single NR cell. A BS transmits a SSB 510 and a system information signal including a RMSI 512 in the NDL unlicensed band 502. The SSB 510 includes a PBCH signal that provides a location (e.g., a time-frequency resource) of the corresponding RMSI 512 in the NDL unlicensed band 502. The BS transmits a SSB 514 and a system information signal including a RMSI 516 in the SDL licensed band 504a and transmits a SSB 518 and a system information signal including a RMSI 520 in the SDL licensed band 504b. The RMSI 512 indicates a transmission configuration for a system information signal in the SDL licensed band 504a and/or the SDL licensed band 504b. The transmission configuration provides information to the UE about the location of other SSBs in one or more of the SDL licensed band 504a and/or the SDL licensed band 504b.

Each of the NDL unlicensed band 502 and the SDL licensed band 504a, 504b can be in any suitable frequencies. In an example, the NDL unlicensed band 502 is in the sub-6 GHz frequency band, and the SDL licensed band 504a, 504b is in the mmWave frequency band. In another example, the NDL unlicensed band 502 and the SDL licensed band 504a, 504b are in the mmWave frequency band.

Figure 6:
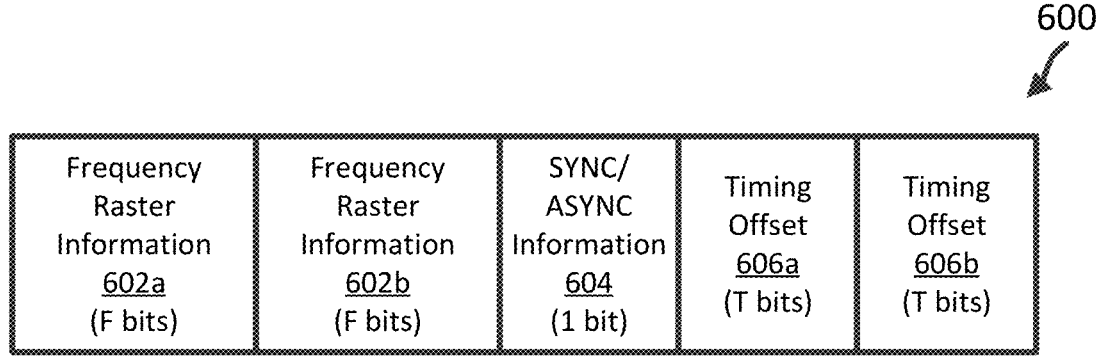
FIG. 6 illustrates a transmission configuration scheme indicated by the remaining minimum system information (RMSI) according to one or more embodiments of the present disclosure.

The RMSI 512 in the NDL unlicensed band indicates a transmission configuration including a list of a plurality of SSB locations in a plurality of SDL licensed bands (e.g., SDL licensed bands 504a and 504b). The UE may receive the RMSI 512 and be able to more easily find the SSB 514 in the SDL licensed band 504a and the SSB 518 in the SDL licensed band 504b. FIG. 6 illustrates a transmission configuration scheme 600 according to one or more embodiments of the present disclosure. In the example illustrated in FIG. 6, the transmission configuration scheme 600 includes frequency raster information 602a, frequency raster information 602b, a SYNC/ASYNC indicator 604, a timing offset 606a, and a timing offset 606b. The transmission configuration scheme 600 includes different frequency raster information 602a and 602b and different timing offsets 606a and 606b. In an example referring to FIGS. 5 and 6, the RMSI 512 in the NDL unlicensed band 502 indicates a transmission configuration including the frequency raster information 602a and the timing offset 606a, which correspond to the SDL licensed band 602a, and the frequency raster information 602b and the timing offset 606b, which correspond to the SDL licensed band 602b. If the transmission of the SSBs in the NDL unlicensed band 502 and the SDL licensed band 504a are synchronous, the timing offset 606a refers to the timing offset between SSBs on the NDL unlicensed band 502 and the SDL licensed band 504a. Similarly, if the transmission of the SSBs in the NDL unlicensed band 502 and the SDL licensed band 504a are synchronous, the timing offset 606b refers to the timing offset between SSBs on the NDL unlicensed band 502 and the SDL licensed band 504b.

Figure 7:
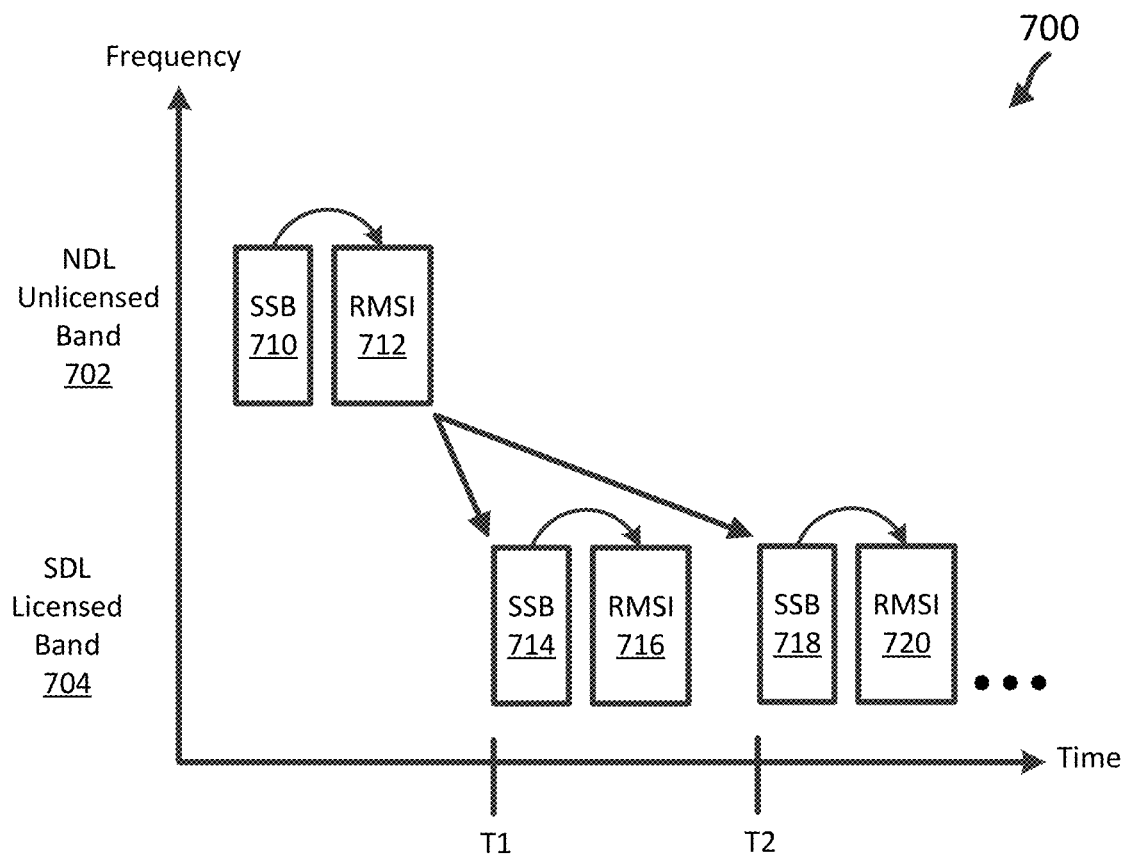
FIG. 7 illustrates a communication scheme for multiple NR cells that operate in the SDL frequency band according to one or more embodiments of the present disclosure.

In an example, coverage by a SDL licensed band in the mmWave frequency band may be different from coverage by a NDL unlicensed band. In this example, a plurality of SDL licensed bands from different mmWave cells may be visible in the geographic region falling under the coverage of a single NDL unlicensed band. Additionally, the mmWave cells may all be on the same frequency, with a plurality of SSB locations in the SDL licensed band having different timing offsets. FIG. 7 illustrates a communication scheme 700 for multiple NR cells in the SDL frequency band according to one or more embodiments of the present disclosure. The x-axis represents time in some constant units, and the y-axis represents frequency in some constant units. The scheme 700 may be employed by BSs such as the BSs 105, 205 or by UEs such as the UEs 115, 215 in a network such as the network 100, 200.

The scheme 700 illustrates transmission of anchor signals (e.g., SSBs) in a SDL licensed band 704 by multiple NR cells supported by a single NDL unlicensed band 702. A BS transmits a SSB 710 and a system information signal including a RMSI 712 in the NDL unlicensed band 702. The SSB 710 includes a PBCH signal that provides a location (e.g., a time-frequency resource) of the corresponding RMSI 712 in the NDL unlicensed band 702. The BS transmits in the SDL licensed band 704, a SSB 714 at a first time T1 and transmits a SSB 718 at a second time T2, where the second time T2 is later than the first time T1. Additionally, the BS transmits a system information signal including a RMSI 716, and the SSB 714 includes a PBCH signal that provides a location of the corresponding RMSI 716 in the SDL licensed band 704. The BS transmits a system information signal including a RMSI 720, and the SSB 718 includes a PBCH signal that provides a location of the corresponding RMSI 720 in the SDL licensed band 704.

Each of the NDL unlicensed band 702 and the SDL licensed band 704 can be in any suitable frequencies. In an example, the NDL unlicensed band 702 is in the sub-6 GHz frequency band, and the SDL licensed band 704 is in the mmWave frequency band. In another example, the NDL unlicensed band 702 and the SDL licensed band 704 are in the mmWave frequency band.

The RMSI 712 in the NDL unlicensed band 702 indicates a transmission configuration for system information signals in the SDL licensed band 704. In an example, the transmission configuration includes a list of a plurality of SSB locations (e.g., locations of SSBs 714 and 718) in the SDL licensed band 704. The UE may receive the RMSI 712 and be able to more easily find the SSB 714 and the SSB 718 in the SDL licensed band 704.

Figure 8:
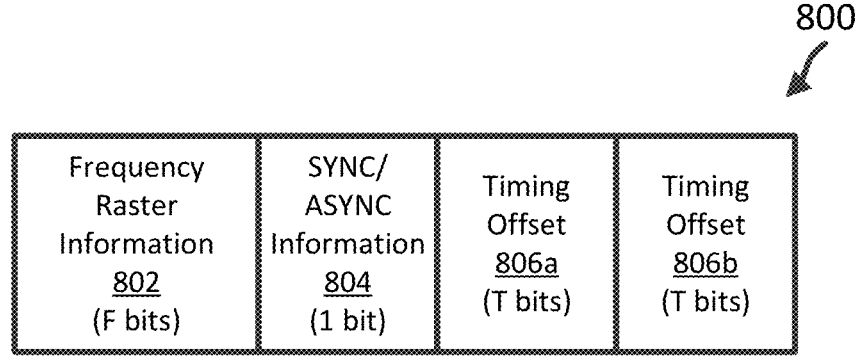
FIG. 8 illustrates a transmission configuration scheme according to one or more embodiments of the present disclosure.

FIG. 8 illustrates a transmission configuration scheme 800 according to one or more embodiments of the present disclosure. In the example illustrated in FIG. 8, the transmission configuration scheme 800 includes frequency raster information 802, a SYNC/ASYNC indicator 804, a timing offset 806a, and a timing offset 806b. The transmission configuration scheme 800 includes different timing offsets 806a and 806b. In an example referring to FIGS. 7 and 8, the RMSI 712 in the NDL unlicensed band 702 includes a transmission configuration including the timing offset 806a and the timing offset 806b, where the timing offset 806a corresponds to the transmission of the SSB 710 relative to the transmission of the SSB 714, and the timing offset 806b corresponds to the transmission of the SSB 710 relative to the transmission of the SSB 718.

In some examples, the transmission configuration includes additional information such as beam-specific information (e.g., beam direction or beam indexes) corresponding to a SSB. When a BS operates at a high-frequency range (e.g., mmWave frequency band), the BS may communicate with a UE using directional beams to overcome the high path-loss in the high-frequency range. The BS may sweep the directional beams in multiple directions for the SSB transmissions to allow UEs located in different directions with respect to the BS to search and synchronize to the BS. In an example, a BS may transmit each SSB over a transmission beam directing towards a different beam direction, and a beam index is assigned to each beam direction. A beam or beam direction may be mapped to a SSB index. The mapping of a beam to a SSB index refers to the transmission of a SSB corresponding to the SSB index in the beam direction.

Figure 9:
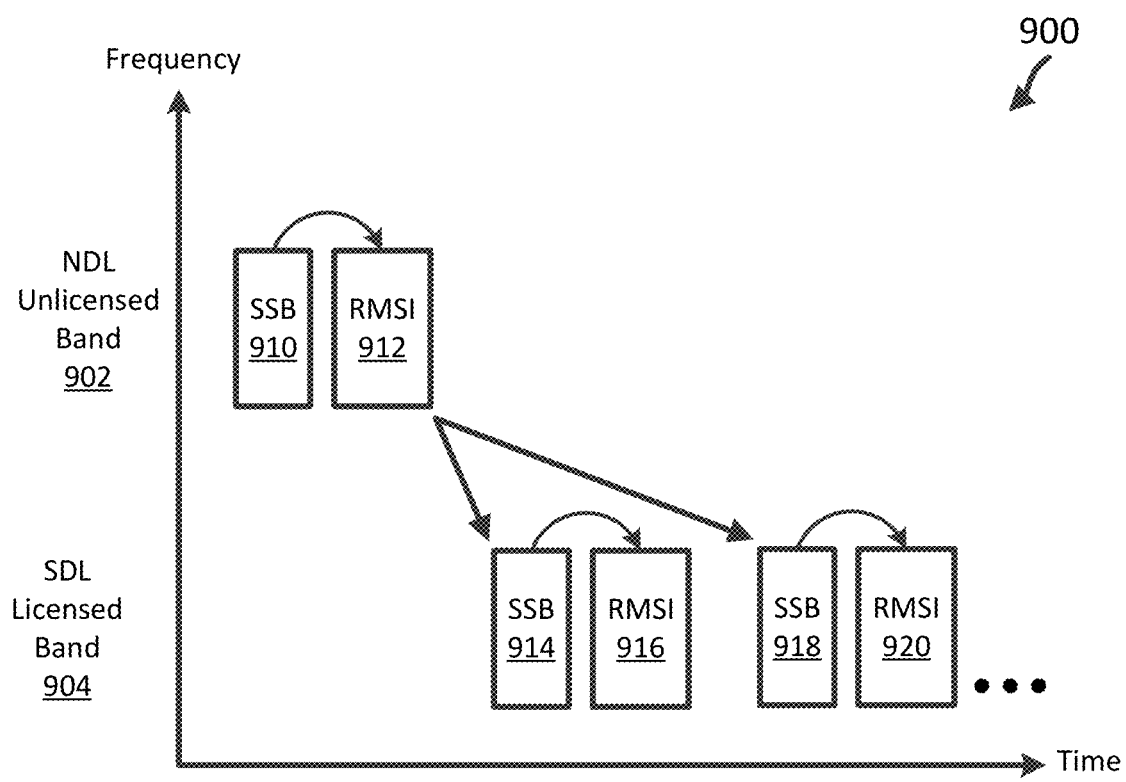
FIG. 9 illustrates a communication scheme for communicating using a cross-carrier frequency indication to provide beam-specific information according to one or more embodiments of the present disclosure.

FIG. 9 illustrates a communication scheme 900 for communicating using a cross-carrier frequency indication to provide beam-specific information according to one or more embodiments of the present disclosure. The x-axis represents time in some constant units, and the y-axis represents frequency in some constant units. The scheme 900 may be employed by BSs such as the BSs 105, 205 or by UEs such as the UEs 115, 215 in a network such as the network 100, 200.

The scheme 900 illustrates transmission of anchor signals (e.g., SSBs) in both a NDL unlicensed band 902 and a SDL licensed band 904. The BS transmits in the NDL unlicensed band 902, a SSB 910 and a corresponding RMSI 912. Additionally, the transmits in the SDL licensed band 904, a SSB 914 and a corresponding RMSI 916 and a SSB 918 and a corresponding RMSI 920. In an example, the SSBs 914 and 918 correspond to different beam directions on the SDL licensed band 904. A single BS may transmit N SSBs including the SSBs 914 and 918, where N is a number greater than two, and each of the N SSBs corresponds to a different beam direction relative to each other in the SDL licensed band 904.

In some examples, the RMSI 912 in the NDL unlicensed band 902 indicates a transmission configuration including beam-specific information related to transmission of a plurality of SSBs in the SDL licensed band 904. The transmission configuration may include, for example, at least one of a beam direction used for the transmission of each of the plurality of SSBs, beam indexes corresponding to the plurality of SSBs, timing offset information for the location of the different transmission beams, a number of beams associated with the SSBs transmitted in the SDL licensed band 904, and/or a designated time period for transmitting the SSBs.

With the information provided in the RMSI 912, it may be unnecessary for the UE to blindly detect the different beams and determine their pattern. Although the UE may still monitor for the different beams, the UE may map a beam index to the timing of a SSB transmission in accordance with beam-to-SSB index mappings. For example, if the transmission configuration specifies that the BS is sweeping over 16 transmission beams (as opposed to 64 transmission beams), this information may provide useful information to the UE because the UE may otherwise blindly search for how many beams are being transmitted by the BS or for the measurement window during which the SSBs are transmitted. Accordingly, use of the beam-specific information may reduce the complexity of the UE's search for the SSBs in the SDL licensed band 904.

Each of the NDL unlicensed band 902 and the SDL licensed band 904 can be in any suitable frequencies. In an example, the NDL unlicensed band 902 is in the sub-6 GHz frequency band, and the SDL licensed band 904 is in the mmWave frequency band. In another example, the NDL unlicensed band 902 and the SDL licensed band 904 are in the mmWave frequency band.

During initial network access, the UE and the BS may perform a random access procedure before entering a normal operation stage, where operational data may be exchanged. In some examples, the UE and the BS perform a four-step random access procedure or a two-step random procedure. In the four-step random access procedure, the UE transmits a first random access message (MSG 1) carrying a random access preamble according to the RACH configuration. After sending the MSG 1, the UE monitors for a second random access message (MSG 2) from the BS within a random access response (RAR) window. For each detected random access preamble, the BS transmits a MSG 2 according to the random access message transmission configuration. The MSG 2, which is the RAR, is a response to the random access preamble received from the UE and carries an UL grant that may be used by the UE to transmit content to the BS. Upon detecting the MSG 2, the UE processes the MSG 2 and responds to the RAR received from the BS by transmitting a third random access message (MSG 3) according to the random access message transmission configuration. The MSG 3 carries a connection request to the BS. The BS receives the MSG 3 and acknowledges its receipt by sending a fourth random access message (e.g., MSG 4), which carries a connection response, to the UE. In the two-step random access procedure, the UE transmits a first enhanced message 1 (eMSG 1), which includes the MSG1 and the MSG3. Upon detecting the eMSG 1, the BS processes the eMSG 1 and transmits the eMSG 2, which includes the MSG 2 and MSG 4.

The UEs that use anchor signals from the NDL unlicensed band or the SDL licensed band may use RACH resources on a single, shared NUL unlicensed band. In some examples, the BS distinguishes between UEs associated with anchor signals in the NDL unlicensed band versus in the SDL licensed band by RACH resource partitioning. The NDL unlicensed band and the SDL licensed band may have different UL RACH resources on the UL unlicensed band such that the BS is aware of whether the UE is associated with the SDL licensed band or the NDL unlicensed band. A RACH parameter sent in the SDL licensed band may take into account the different path loss and beamforming gain between the SDL licensed band and the UL unlicensed band. Additionally, if a single NDL unlicensed band is associated with a plurality of SDL licensed bands, the RACH resources may be partitioned into multiple SDL licensed bands. The NDL unlicensed band and the SDL licensed band may have different RACH resources on the same NUL unlicensed band such that when the BS processes UL data (e.g., MSG 1) from the UE, the BS knows whether the UL data is being sent by a UE in response to reception of DL data on the NDL unlicensed band or the SDL licensed band.

Figure 10:
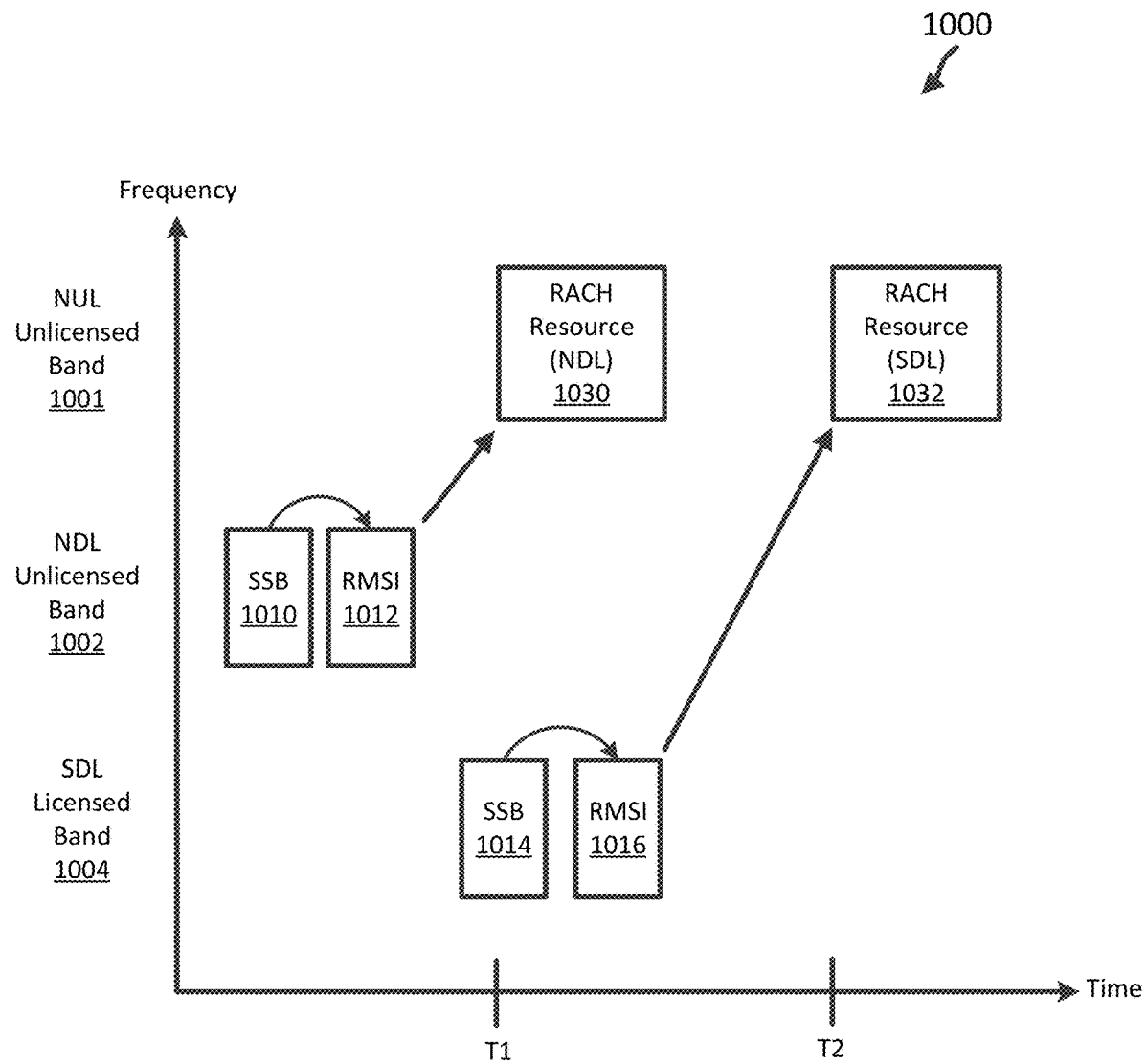
FIG. 10 illustrates a time-domain partitioning scheme for partitioning random access channel (RACH) resources according to one or more embodiments of the present disclosure.

FIG. 10 illustrates a time-domain partitioning scheme 1000 for partitioning RACH resources according to one or more embodiments of the present disclosure. The x-axis represents time in some constant units, and the y-axis represents frequency in some constant units. The scheme 1000 may be employed by BSs such as the BSs 105, 205 or by UEs such as the UEs 115, 215 in a network such as the network 100, 200. The RACH resources for a NDL unlicensed band 1002 and a SDL licensed band 1004 are partitioned in the time domain. The RMSI in a particular frequency band may indicate a transmission configuration including a time domain-to-RACH resource mapping. The RMSI provides information to the UE regarding the available RACH resources for transmission of UL data (e.g., MSG 1) at a particular time resource in a NUL unlicensed band 1001.

A BS transmits a SSB 1010 and a system information signal including a RMSI 1012 in the NDL unlicensed band 1002. The SSB 1010 includes a PBCH signal that provides a location (e.g., a time-frequency resource) of the corresponding RMSI 1012 in the NDL unlicensed band 1002. The RMSI 1012 indicates a RACH configuration for the NUL unlicensed band 1001 and a RACH resource (NDL) 1030 corresponding to SSBs received in the NDL unlicensed band 1002. The RACH resource (NDL) 1030 is located at a time T1 in the NUL unlicensed band 1001. If a UE receives an anchor signal (e.g., the SSB 1010) in the NDL unlicensed band 1002, the UE transmits in the NUL unlicensed band 1001, UL data (e.g., MSG 1) using the RACH resource (NDL) 1030 at the time T1. If the BS receives a RACH resource at time T1 in the NUL unlicensed band 1001, the BS determines that the UL data is in response to reception in the NDL unlicensed band 1002 by a UE. Accordingly, the BS may transmit in the NDL unlicensed band 1002, DL data (e.g., MSG 2) to the UE.

The BS transmits a SSB 1014 and a system information signal including a RMSI 1016 in the SDL licensed band 1004. The SSB 1014 includes a PBCH signal that provides a location (e.g., a time-frequency resource) of the corresponding RMSI 1016 in the SDL licensed band 1004. The RMSI 1016 indicates a RACH configuration for the NUL unlicensed band 1001 and a RACH resource (SDL) 1032 corresponding to SSBs received in the SDL licensed band 1004. The RACH resource (SDL) 1032 is located at a time T2 in the NUL unlicensed band 1001. If a UE receives an anchor signal (e.g., the SSB 1014) in the SDL licensed band 1004, the UE transmits in the NUL unlicensed band 1001, UL data (e.g., MSG 1) using the RACH resource (SDL) 1032 at the time T2. If the BS receives a RACH resource at time T2 in the NUL unlicensed band 1001, the BS determines that the UL data is in response to reception in the SDL licensed band 1004 by a UE. Accordingly, the BS may transmit in the SDL licensed band 1004, DL data (e.g., MSG 2) to the UE.

Each of the NDL unlicensed band 1002 and the SDL licensed band 1004 can be in any suitable frequencies. In an example, the NDL unlicensed band 1002 is in the sub-6 GHz frequency band, and the SDL licensed band 1004 is in the mmWave frequency band. In another example, the NDL unlicensed band 1002 and the SDL licensed band 1004 are in the mmWave frequency band.

Figure 11:
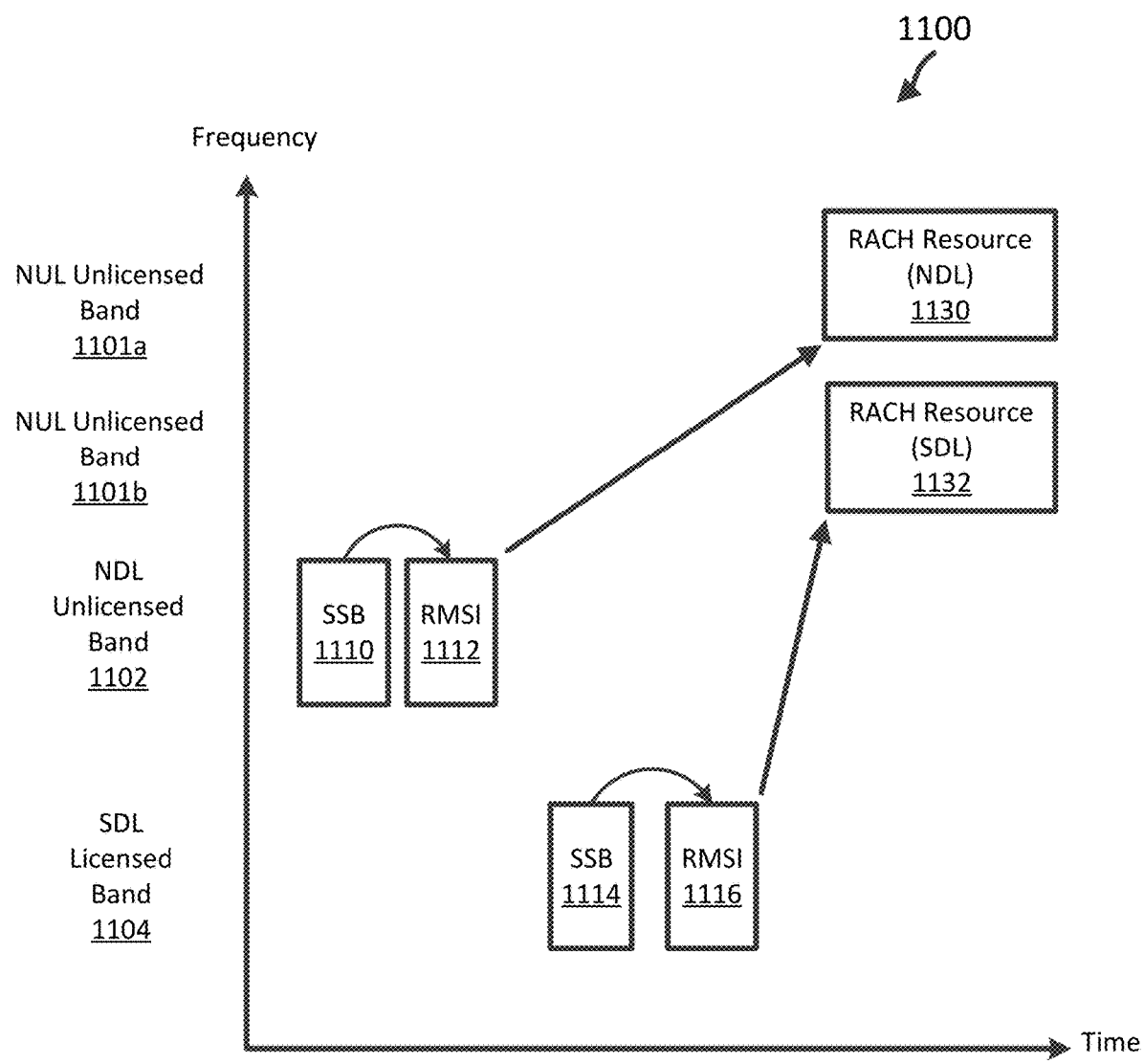
FIG. 11 illustrates a frequency-domain partitioning scheme for partitioning RACH resources according to one or more embodiments of the present disclosure.

In some examples, the RACH resources are partitioned across different UL frequency bands. In some examples, the RACH resources for NDL and SDL are partitioned in different subbands within the same frequency band (e.g., within a single UL band). FIG. 11 illustrates a frequency-domain partitioning scheme 1100 for partitioning RACH resources according to one or more embodiments of the present disclosure. The x-axis represents time in some constant units, and the y-axis represents frequency in some constant units. The scheme 1100 may be employed by BSs such as the BSs 115, 205 or by UEs such as the UEs 115, 215 in a network such as the network 100, 200. The RACH resources for a NDL unlicensed band 1102 and a SDL licensed band 1104 are partitioned in the frequency domain. The RMSI in a particular frequency band may indicate a transmission configuration including a DL frequency band-to-RACH resource mapping. The RMSI provides information to the UE regarding the available RACH resources for transmission of a RACH preamble (e.g., MSG 1) in a NUL unlicensed band 1101a or a NUL unlicensed band 1101b.

A BS transmits a SSB 1110 and a system information signal including a RMSI 1112 in the NDL unlicensed band 1102. The SSB 1110 includes a PBCH signal that provides a location (e.g., a time-frequency resource) of the corresponding RMSI 1112 in the NDL unlicensed band 1102. The RMSI 1112 indicates a RACH configuration for the NUL unlicensed band 1101a and a RACH resource (NDL) 1130 corresponding to SSBs received in the NDL unlicensed band 1102. The RACH resource (NDL) 1130 is located in the NUL unlicensed band 1101a. If a UE receives an anchor signal (e.g., the SSB 1110) in the NDL unlicensed band 1102, the UE transmits in the NUL unlicensed band 1101a, UL data (e.g., MSG 1) using the RACH resource (NDL) 1130. If the BS receives a RACH resource in the NUL unlicensed band 1101a, the BS determines that the UL data is in response to reception in the NDL unlicensed band 1102 by a UE. Accordingly, the BS may transmit in the NDL unlicensed band 1102, DL data (e.g., MSG 2) to the UE.

The BS transmits a SSB 1114 and a system information signal including a RMSI 1116 in the SDL licensed band 1104. The SSB 1114 includes a PBCH signal that provides a location (e.g., a time-frequency resource) of the corresponding RMSI 1116 in the SDL licensed band 1104. The RMSI 1116 indicates a RACH configuration for the NUL unlicensed band 1101b and a RACH resource (SDL) 1132 corresponding to SSBs received in the SDL licensed band 1104. The RACH resource (SDL) 1132 is located in the NUL unlicensed band 1101b. If a UE receives an anchor signal (e.g., the SSB 1114) in the SDL licensed band 1104, the UE transmits in the NUL unlicensed band 1101b, UL data (e.g., MSG 1) using the RACH resource (SDL) 1132. If the BS receives a RACH resource in the NUL unlicensed band 1101b, the BS determines that the UL data is in response to reception in the SDL licensed band 1104 by a UE. Accordingly, the BS may transmit in the SDL licensed band 1104, data RAR (e.g., MSG 2) to the UE.

Each of the NDL unlicensed band 1102 and the SDL licensed band 1104 can be in any suitable frequencies. In an example, the NDL unlicensed band 1102 is in the sub-6 GHz frequency band, and the SDL licensed band 1104 is in the mmWave frequency band. In another example, the NDL unlicensed band 1102 and the SDL licensed band 1104 are in the mmWave frequency band.

Figure 12:
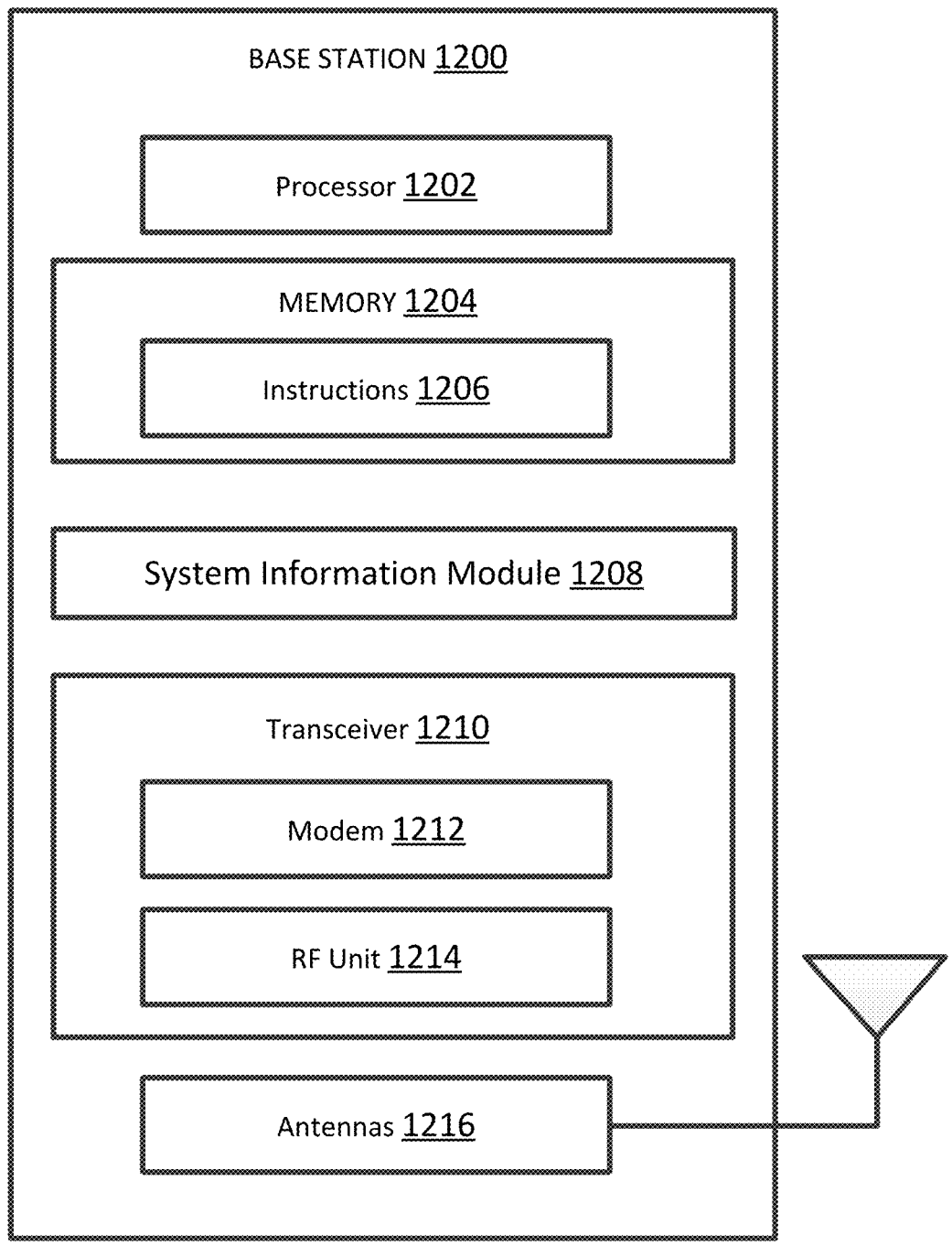
FIG. 12 is a block diagram of an exemplary base station (BS) according to one or more embodiments of the present disclosure.

In some examples, a combination of the time-domain and the frequency-domain partitioning scheme for partitioning RACH resources discussed in relation to FIGS. 11 and 12 may be implemented.

FIG. 12 is a block diagram of an exemplary BS 1200 according to one or more embodiments of the present disclosure. The BS 1200 may be a BS 105 or 205, as discussed above. As shown, the BS 1200 may include a processor 1202, a memory 1204, a system information module 1208, a transceiver 1210 including a modem subsystem 1212 and a radio frequency (RF) unit 1214, and one or more antennas 1216. These elements may be in direct or indirect communication with each other, for example via one or more buses.

The processor 1202 may have various features as a specific-type processor. For example, these may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid-state memory device, hard disk drives, other forms of volatile and non-volatile memory, or a combination of different types of memory. In an embodiment, the memory 1204 includes a non-transitory computer-readable medium. The memory 1204 may store instructions 1206. The instructions 1206 may include instructions that, when executed by the processor 1202, cause the processor 1202 to perform the operations described herein with reference to the BS 105 in connection with embodiments of the present disclosure. Instructions 1206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The system information module 1208 may be implemented via hardware, software, or combinations thereof. For example, the system information module 1208 may be implemented as a processor, circuit, and/or instructions 1206 stored in the memory 1204 and executed by the processor 1202. The system information module 1208 may be used for various aspects of the present disclosure. The system information module 1208 is configured to communicate with a wireless communication device in a first frequency band, a first system information signal indicating a transmission configuration for a second system information signal in a second frequency band different from the first frequency band. Additionally, the system information module 1208 is configured to communicate with the wireless communication device in the second frequency band, the second system information signal based on the transmission configuration.

The system information module 1208 may transmit anchor signals corresponding to the first and second system information signals in both the first and second frequency bands. The transmission configuration for the second frequency band may include, for example, at least one of a frequency raster information (e.g., the partitioning of a frequency band into channels and information, such as channel bandwidth, center frequency, separation between channels, etc.), an indication of whether transmission of the SSBs in the first and second frequency bands are synchronous or asynchronous, a timing offset between SSBs in the first and second frequency bands, or beam indices and/or a number of beams applied in relation to transmission of a SSBs in the second frequency band.

As shown, the transceiver 1210 may include the modem subsystem 1212 and the RF unit 1214. The transceiver 1210 can be configured to communicate bi-directionally with other devices, such as the UEs 125 and/or another core network element. The modem subsystem 1212 may be configured to modulate and/or encode data from the memory 1204 and/or the system information module 1208 according to a modulation and coding scheme (MCS), e.g., a low-density parity check (LDPC) coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data from the modem subsystem 1212 (on outbound transmissions) or of transmissions originating from another source such as a UE 125 or a BS 105. The RF unit 1214 may be further configured to perform analog beamforming in conjunction with the digital beamforming. Although shown as integrated together in transceiver 1210, the modem subsystem 1212 and the RF unit 1214 may be separate devices that are coupled together at the BS 1200 to enable the BS 1200 to communicate with other devices.

The RF unit 1214 may provide the modulated and/or processed data, e.g. data packets (or, more generally, data messages that may contain one or more data packets and other information), to the antennas 1216 for transmission to one or more other devices. The antennas 1216 may further receive data messages transmitted from other devices and provide the received data messages for processing and/or demodulation at the transceiver 1210. The antennas 1216 may include multiple antennas of similar or different designs to sustain multiple transmission links. The RF unit 1214 may configure the antennas 1216.

Figure 13:
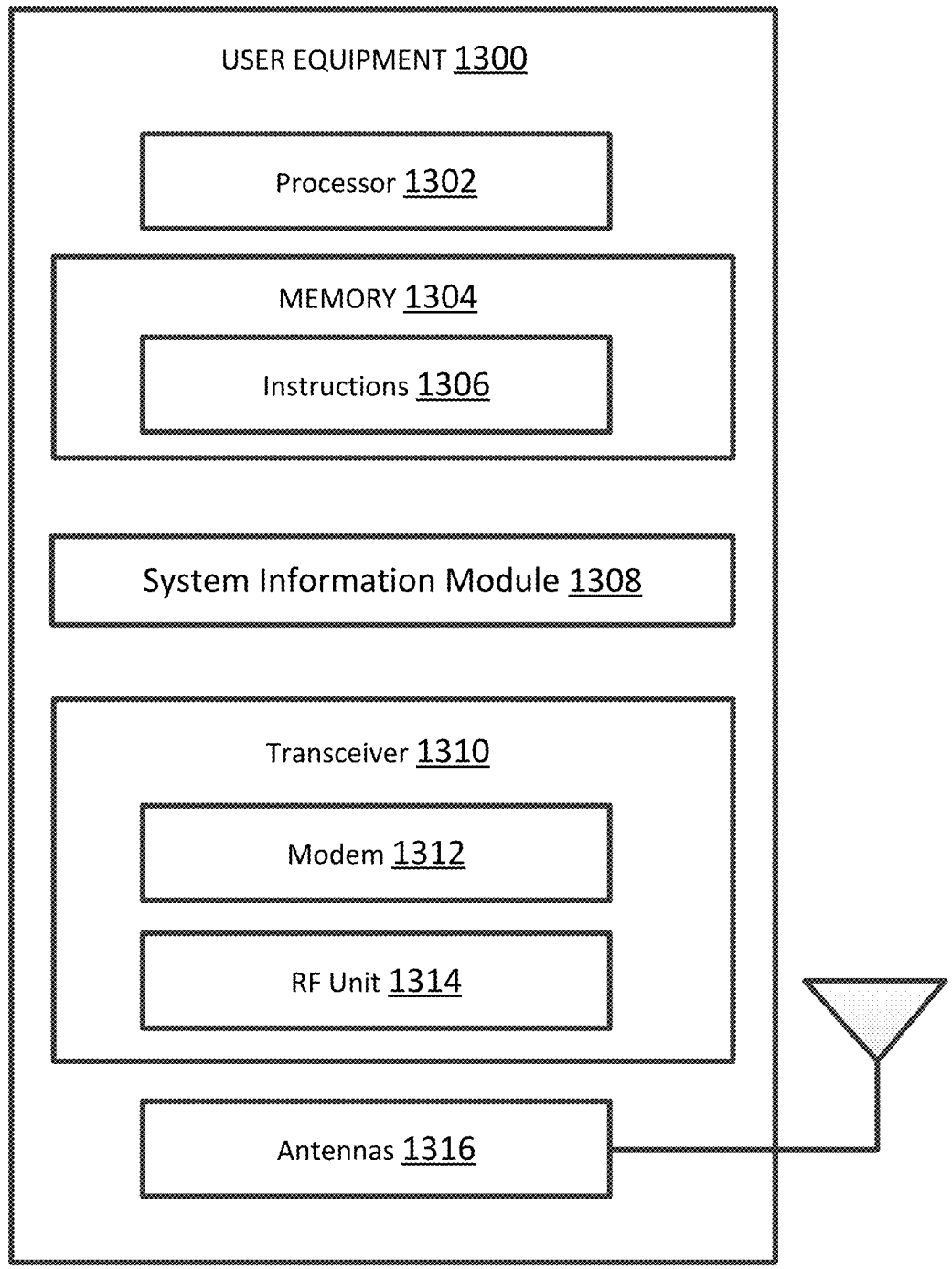
FIG. 13 is a block diagram of an exemplary user equipment (UE) according to one or more embodiments of the present disclosure.

FIG. 13 is a block diagram of an exemplary UE 1300 according to one or more embodiments of the present disclosure. The UE 1300 may be a UE 115 or 215, as discussed above. As shown, the UE 1300 may include a processor 1302, a memory 1304, a system information module 1308, a transceiver 1310 including a modem subsystem 1312 and a RF unit 1314, and one or more antennas 1316. These elements may be in direct or indirect communication with each other, for example via one or more buses.

The processor 1302 may include a CPU, a DSC, an ASIC, a controller, a FPGA device, another hardware device, a firmware device, or any combination thereof configured to perform the operations described herein. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In an embodiment, the memory 1304 includes a non-transitory computer-readable medium. The memory 1304 may store instructions 1306. The instructions 1306 may include instructions that, when executed by the processor 1302, cause the processor 1302 to perform operations described herein with reference to the UE 115 in connection with embodiments of the present disclosure. Instructions 1306 may also be referred to as code, which may be interpreted broadly to include any type of computer-readable statement(s) as discussed above with respect to FIG. 12.

The system information module 1308 may be implemented via hardware, software, or combinations thereof. For example, the system information module 1308 may be implemented as a processor, circuit, and/or instructions 1306 stored in the memory 1304 and executed by the processor 1302. The system information module 1308 may be used for various aspects of the present disclosure. The system information module 1308 is configured to communicate with a wireless communication device in a first frequency band, a first system information signal indicating a transmission configuration for a second system information signal in a second frequency band different from the first frequency band. Additionally, the system information module 1308 is configured to communicate with the wireless communication device in the second frequency band, the second system information signal based on the transmission configuration.

The system information module 1208 may receive anchor signals corresponding to the first and second system information signals in both the first and second frequency bands. The transmission configuration for the second frequency band may include, for example, at least one of a frequency raster information (e.g., the partitioning of a frequency band into channels and information, such as channel bandwidth, center frequency, separation between channels, etc.), an indication of whether transmission of the SSBs in the first and second frequency bands are synchronous or asynchronous, a timing offset between SSBs in the first and second frequency bands, or beam indices and/or a number of beams applied in relation to transmission of a SSBs in the second frequency band.

As shown, the transceiver 1310 may include the modem subsystem 1312 and the RF unit 1314. The transceiver 1310 can be configured to communicate bi-directionally with other devices, such as the BSs 105 and/or another core network element. The modem subsystem 1312 may be configured to modulate and/or encode the data from the memory 1304 and/or the system information module 308 according to a MCS, e.g., a LDPC coding scheme, a turbo coding scheme, a convolutional coding scheme, a digital beamforming scheme, etc. The RF unit 1314 may be configured to process (e.g., perform analog to digital conversion or digital to analog conversion, etc.) modulated/encoded data from the modem subsystem 1312 (on outbound transmissions) or of transmissions originating from another source such as a UE 115 or a BS 105. The RF unit 1314 may be further configured to perform analog beamforming in conjunction with the digital beamforming. Although shown as integrated together in transceiver 1310, the modem subsystem 1312 and the RF unit 1314 may be separate devices that are coupled together at the UE 115 to enable the UE 115 to communicate with other devices.

The RF unit 1314 may provide the modulated and/or processed data, e.g. data packets (or, more generally, data messages that may contain one or more data packets and other information), to the antennas 1316 for transmission to one or more other devices. The antennas 1316 may further receive data messages transmitted from other devices and provide the received data messages for processing and/or demodulation at the transceiver 1310. The antennas 1316 may include multiple antennas of similar or different designs in order to sustain multiple transmission links. The RF unit 1314 may configure the antennas 1316.

Figure 14:
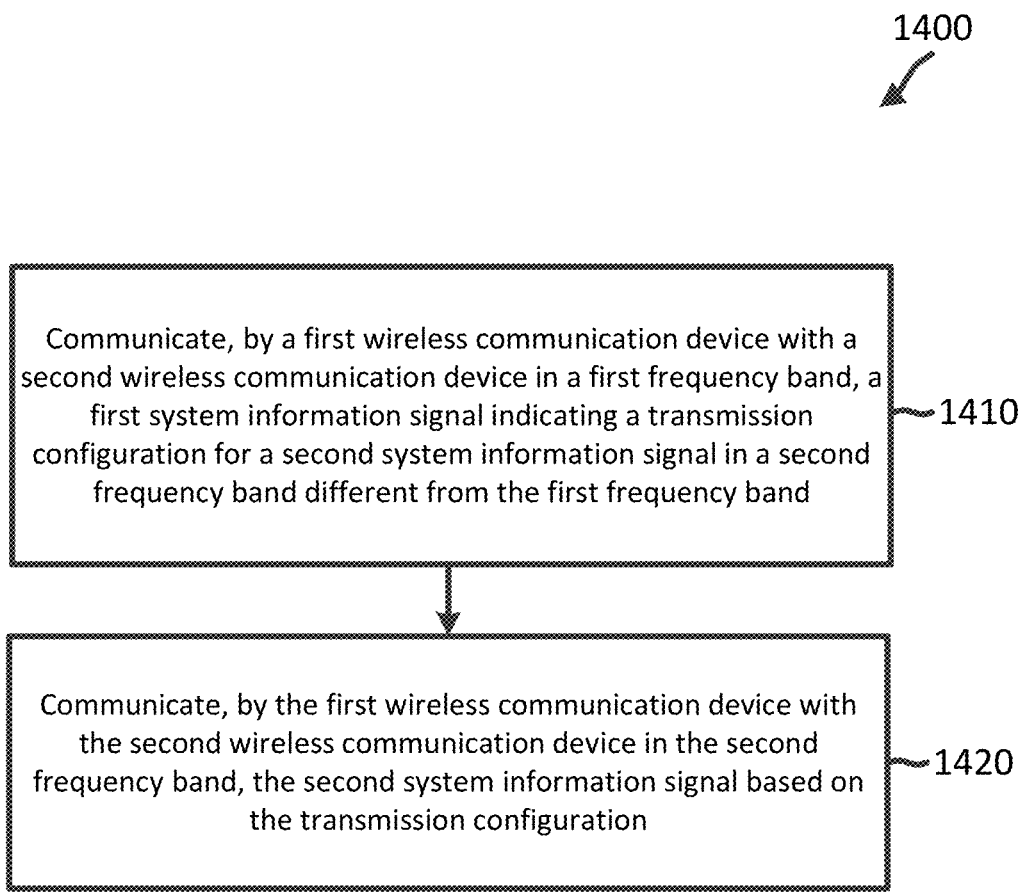
FIG. 14 is a flow diagram of communicating a system information signals in a communication method according to one or more embodiments of the present disclosure.

FIG. 14 is a flow diagram of communicating a system information signals in a communication method 1400 according to one or more embodiments of the present disclosure. Steps of the method 1400 can be executed by a computing device (e.g., a processor, processing circuit, and/or other suitable component) of a wireless communication device, such as the BSs 105, 205, 1200 and the UEs 115, 215, 1300. The method 1400 may employ similar mechanisms as in the schemes 300, 400, 500, 600, 700, 800, 900, 1000, and 1100 described above with respect to FIGS. 3-11, respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes communicating, by a first wireless communication device with a second wireless communication device in a first frequency band, a first system information signal indicating a transmission configuration for a second system information signal in a second frequency band different from the first frequency band.

At step 1420, the method 1400 includes communicating, by the first wireless communication device with the second wireless communication device in the second frequency band, the second system information signal based on the transmission configuration.

In an example, the first wireless communication device may correspond to a BS and the second wireless communication device may correspond to a UE. In this example, the BS transmits in a first frequency band, a first system information signal indicating a transmission configuration for a second system information signal in a second frequency band different from the first frequency band. Additionally, the BS transmits in the second frequency band, the second system information signal based on the transmission configuration.

In another example, the first wireless communication device may correspond to a UE and the second wireless communication device may correspond to a BS. In this example, the UE receives transmits in a first frequency band, a first system information signal indicating a transmission configuration for a second system information signal in a second frequency band different from the first frequency band. Additionally, the UE receives in the second frequency band, the second system information signal based on the transmission configuration.

In an example, the first frequency band is a NDL frequency band, and the second frequency band is a SDL frequency band. In another example, the first frequency band is a SDL frequency band, and the second frequency band is a NDL frequency band. The NDL frequency band may be unlicensed spectrum, and the SDL frequency band may be licensed spectrum.

In some examples, the first system information signal is a broadcast communication signal including RMSI, and the second system information signal includes a first SSB. The RMSI may indicate the transmission configuration for the first SSB. Additionally, the first wireless communication device may communicate a third system information signal including a second SSB providing a location of the RMSI in the first frequency band. The transmission configuration may include at least one of frequency raster information, an indication of whether transmissions of the first and second SSBs are synchronous, and a timing offset between the first SSB and the second SSB. The second system information signal may include a set of SSBs, and the transmission configuration includes beam-specific information for the set of SSBs. The beam-specific information may include a mapping of a beam to a SSB index for each SSB of the set of SSBs.

In some examples, multiple SDL frequency bands may correspond to a single NUL frequency band. In an example, the first system information signal also indicates a second transmission configuration for a third system information signal in a third frequency band different from the first and second frequency bands. The second system information signal may include a first SSB, and the third system information signal may include a second SSB. Additionally, the first transmission configuration may include a location of the first SSB in the second frequency band, and the second transmission configuration may include a location of the second SSB in the third frequency band.

In some examples the first wireless communication device communicates with the second wireless communication device in a third frequency band, a third system information signal indicating a second transmission configuration for a fourth system information signal in the second frequency band. In an example, the first system information signal indicates a first RACH resource in the second frequency band, and the third system information signal indicates a second RACH resource in the second frequency band. The first and second RACH resources may be partitioned in accordance with a time-domain partitioning scheme and/or a frequency-domain partitioning scheme. Additionally, the second frequency band is a NUL frequency band corresponding to the first and third frequency bands, which may be NDL or SDL frequency bands.

In some examples, the first system information signal indicates a first RACH resource in the second frequency band, and the second system information signal indicates a second RACH resource in the second frequency band. In an example, the first and second RACH resources are partitioned in accordance with a time-domain partitioning scheme. In another example, the first and second RACH resources are partitioned in accordance with a frequency-domain partitioning scheme. The second frequency band may include a NUL frequency band and a NDL frequency band.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, including communicating, by a first wireless communication device with a second wireless communication device in a first frequency band, a first system information signal indicating a transmission configuration for a second system information signal in a second frequency band different from the first frequency band; and communicating, by the first wireless communication device with the second wireless communication device in the second frequency band, the second system information signal based on the transmission configuration.

In some examples, one of the first frequency band or the second frequency band is a NDL frequency band, and the other one of the first frequency band or the second frequency band is a SDL frequency band. In some examples, one of the first frequency band or the second frequency band is in a licensed spectrum, and the other one of the first frequency band or the second frequency band is in an unlicensed spectrum. In some examples, the first system information signal is a broadcast communication signal including RMSI. In some examples, the second system information signal includes a first SSB, and the RMSI indicates the transmission configuration for the first SSB. In some examples, the method includes communicating, by the first wireless communication device with the second wireless communication device in the first frequency band, a third system information signal including a second SSB providing a location of the RMSI in the first frequency band. In some examples, transmission configuration includes an indication of whether transmissions of the first and second SSBs are synchronous. In some examples, the transmissions of the first and second SSBs are synchronous, and the transmission configuration includes a timing offset between the first SSB and the second SSB.

In some examples, the transmission configuration includes frequency raster information for the second frequency band. In some examples, the second system information signal includes a set of SSBs, the transmission configuration includes beam-specific information for the set of SSBs, and the beam-specific information includes a mapping of a beam to a SSB index for each SSB of the set of SSBs. In some examples, the first system information signal further indicates a second transmission configuration for a third system information signal in a third frequency band different from the first and second frequency bands. In some examples, the first frequency band is a NDL frequency band, the second frequency band is a first SDL frequency band, and the third frequency band is a second SDL frequency band. In some examples, the second system information signal includes a first SSB, the third system information signal includes a second SSB, the first transmission configuration includes a location of the first SSB in the second frequency band, and the second transmission configuration includes a location of the second SSB in the third frequency band. In some examples, the first system information signal indicates a first random access channel (RACH) resource in the second frequency band, and the second system information signal indicates a second RACH resource in the second frequency band. In some examples, the first and second RACH resources are partitioned in accordance with a time-domain partitioning scheme or a frequency-domain partitioning scheme.

Further embodiments of the present disclosure include an apparatus including a transceiver configured to: communicate, by a first wireless communication device with a second wireless communication device in a first frequency band, a first system information signal indicating a transmission configuration for a second system information signal in a second frequency band different from the first frequency band; and communicate, by the first wireless communication device with the second wireless communication device in the second frequency band, the second system information signal based on the transmission configuration.

In some examples, the transceiver is configured to transmit the first and second system information signals or to receive the first and second system information signals. In some examples, the first wireless communication device is a UE, and the second wireless communication device is a BS, and the transceiver is further configured to: monitor, by the first wireless communication device, the first frequency band for the first system information signal; and search, based on the transmission configuration, for the second system information signal in the second frequency band. In some examples, one of the first frequency band or the second frequency band is in an unlicensed band, and the other one of the first frequency band or the second frequency band is in a licensed band. In some examples, the first system information signal is a broadcast communication signal including RMSI, and wherein the second system information signal includes a first SSB, and the RMSI indicates the transmission configuration for the first SSB. In some examples, the transceiver is configured to communicate, by the first wireless communication device with the second wireless communication device in the first frequency band, a third system information signal including a second SSB providing a location of the RMSI in the first frequency band. In some examples, the first system information signal further indicates a second transmission configuration for a third system information signal in a third frequency band different from the first and second frequency bands, and the second and third frequency bands are SDL frequency bands.

In some examples, the transceiver is configured to communicate, by the first wireless communication device with the second wireless communication device in a third frequency band, a third system information signal indicating a second transmission configuration for a fourth system information signal in the second frequency band, where the second frequency band is a NUL frequency band. In some examples, the first system information signal indicates a first RACH resource in the second frequency band, and the third system information signal indicates a second RACH resource in the second frequency band. In some examples, the third system information signal is a first broadcast communication signal including a first RMSI, and the fourth system information signal is a second broadcast communication signal including a second RMSI. In some examples, the first RMSI includes a first time resource indicating reception of the first RMSI in the first frequency band, and the second RMSI includes a second time resource indicating reception of the second RMSI in the third frequency band. In some examples, the first RMSI includes a first frequency resource indicating reception of the first RMSI in the first frequency band, and the second RMSI includes a second frequency resource indicating reception of the second RMSI in the third frequency band.

Further embodiments of the present disclosure include a computer-readable medium having program code recorded thereon, the program code including: code for causing a first wireless communication device to communicate, with a second wireless communication device in a first frequency band, a first system information signal indicating a transmission configuration for a second system information signal in a second frequency band different from the first frequency band; and code for causing the first wireless communication device to communicate, with the second wireless communication device in the second frequency band, the second system information signal based on the transmission configuration.

In some examples, the first system information signal is a broadcast communication signal including RMSI, where the second system information signal includes a first SSB, and where the RMSI indicates the transmission configuration for the first SSB, the program code comprising: code for causing the first wireless communication device to communicate, with the second wireless communication device in the first frequency band, a third system information signal including a second SSB providing a location of the RMSI in the first frequency band. In some examples, the first system information signal further indicates a second transmission configuration for a third system information signal in a third frequency band different from the first and second frequency bands.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
communicating, by a first wireless communication device with a second wireless communication device in a first frequency band, a first system information signal indicating a first transmission configuration for a second system information signal in a second frequency band different from the first frequency band and including a broadcast communication signal having remaining minimum system information (RMSI), wherein:
the second system information signal includes a first synchronization signal block (SSB) and the RMSI indicates the first transmission configuration for the first SSB;
communicating, by the first wireless communication device with the second wireless communication device in the first frequency band, a third system information signal including a second SSB providing a location of the RMSI in the first frequency band; and
communicating, by the first wireless communication device with the second wireless communication device in the second frequency band, the second system information signal based on the first transmission configuration.

2. The method of claim 1, wherein one of the first frequency band or the second frequency band is a normal downlink (NDL) frequency band, and the other one of the first frequency band or the second frequency band is a supplemental downlink (SDL) frequency band.

3. The method of claim 1, wherein one of the first frequency band or the second frequency band is in a licensed spectrum, and the other one of the first frequency band or the second frequency band is in an unlicensed spectrum.

4. The method of claim 1, wherein the first transmission configuration includes an indication of whether transmissions of the first and second SSBs are synchronous.

5. The method of claim 4, wherein the transmissions of the first and second SSBs are synchronous, and the first transmission configuration includes a timing offset between the first SSB and the second SSB.

6. The method of claim 1, wherein the first transmission configuration includes frequency raster information for the second frequency band.

7. The method of claim 1, wherein the second system information signal includes a set of SSBs, and the first transmission configuration includes beam-specific information for the set of SSBs, and wherein the beam-specific information includes a mapping of a beam to a SSB index for each SSB of the set of SSBs.

8. The method of claim 1, wherein the first system information signal further indicates a second transmission configuration for a thifd fourth system information signal in a third frequency band different from the first and second frequency bands.

9. The method of claim 8, wherein the first frequency band is a NDL frequency band, the second frequency band is a first SDL frequency band, and the third frequency band is a second SDL frequency band.

10. The method of claim 8, wherein the fourth system information signal includes a third SSB, wherein the first transmission configuration includes a location of the first SSB in the second frequency band, and the second transmission configuration includes a location of the third SSB in the third frequency band.

11. The method of claim 1, wherein the first wireless communication device is a user equipment (UE), and the second wireless communication device is a base station (BS), the method further comprising:
monitoring the first frequency band for the first system information signal; and
searching, based on the first transmission configuration, for the second system information signal in the second frequency band.

12. A first wireless communication device, comprising:
a transceiver; and
a processor in communication with the transceiver, wherein the first wireless communication device is configured to:
communicate, with a second wireless communication device in a first frequency band, a first system information signal indicating a transmission configuration for a second system information signal in a second frequency band different from the first frequency band;
communicate, with the second wireless communication device in the second frequency band, the second system information signal based on the transmission configuration; and
communicate, with the second wireless communication device in a third frequency band, a third system information signal indicating a second transmission configuration for a fourth system information signal in the second frequency band, wherein the first system information signal indicates a first random access channel (RACH) resource in the second frequency band, and the third system information signal indicates a second RACH resource in the second frequency band.

13. The first wireless communication device of claim 12, wherein the first and second RACH resources are partitioned in accordance with a time-domain partitioning scheme or a frequency-domain partitioning scheme.

14. The first wireless communication device of claim 12, wherein the third system information signal includes a first broadcast communication signal including a first RMSI, and the fourth system information signal includes a second broadcast communication signal including a second RMSI.

15. The first wireless communication device of claim 14, wherein the first RMSI includes a first time resource indicating reception of the first RMSI in the first frequency band, and the second RMSI includes a second time resource indicating reception of the second RMSI in the third frequency band.

16. The first wireless communication device of claim 14, wherein the first RMSI includes a first frequency resource indicating reception of the first RMSI in the first frequency band, and the second RMSI includes a second frequency resource indicating reception of the second RMSI in the third frequency band.

17. A first wireless communication device comprising:
a transceiver; and
a processor in communication with the transceiver, wherein the first wireless communication device is configured to:
communicate, with a second wireless communication device in a first frequency band, a first system information signal indicating a transmission configuration for a second system information signal in a second frequency band different from the first frequency band and including a broadcast communication signal having remaining minimum system information (RMSI), wherein:

the second system information signal includes a first synchronization signal block (SSB) and the RMSI indicates the first transmission configuration for the first SSB;

communicate, with the second wireless communication device in the first frequency band, a third system information signal including a second SSB providing a location of the RMSI in the first frequency band; and communicate, with the second wireless communication device in the second frequency band, the second system information signal based on the transmission configuration.

18. The first wireless communication device of claim 17, wherein the first wireless communication device is configured to transmit the first and second system information signals or to receive the first and second system information signals.

19. The first wireless communication device of claim 17, wherein the first wireless communication device is a user equipment (UE), and the second wireless communication device is a base station (BS), and wherein the first wireless communication device is further configured to:

monitor the first frequency band for the first system information signal; and search, based on the transmission configuration, for the second system information signal in the second frequency band.

20. The first wireless communication device of claim 17, wherein one of the first frequency band or the second frequency band is in an unlicensed band, and the other one of the first frequency band or the second frequency band is in a licensed band.

21. The first wireless communication device of claim 17, wherein the first system information signal further indicates a second transmission configuration for a third system information signal in a third frequency band different from the first and second frequency bands, and the second and third frequency bands are SDL frequency bands.

22. The first wireless communication device of claim 17, wherein the first wireless communication device is configured to:

communicate, with the second wireless communication device in a third frequency band, a third system information signal indicating a second transmission configuration for a fourth system information signal in the second frequency band, wherein the second frequency band is a NUL frequency band.

23. The first wireless communication device of claim 22, wherein the first system information signal indicates a first RACH resource in the second frequency band, and the third system information signal indicates a second RACH resource in the second frequency band.

24. The first wireless communication device of claim 23, wherein the first and second RACH resources are partitioned in accordance with a time-domain partitioning scheme or a frequency-domain partitioning scheme.

25. The first wireless communication device of claim 22, wherein the third system information signal includes a first broadcast communication signal including a first RMSI, and the fourth system information signal includes a second broadcast communication signal including a second RMSI.

26. The first wireless communication device of claim 25, wherein the first RMSI includes a first time resource indicating reception of the first RMSI in the first frequency band, and the second RMSI includes a second time resource indicating reception of the second RMSI in the third frequency band.

27. The first wireless communication device of claim 25, wherein the first RMSI includes a first frequency resource indicating reception of the first RMSI in the first frequency band, and the second RMSI includes a second frequency resource indicating reception of the second RMSI in the third frequency band.

28. The first wireless communication device of claim 17, wherein the transmission configuration includes an indication of whether transmissions of the first and second SSBs are synchronous.

29. The first wireless communication device of claim 17, wherein the transmission configuration includes frequency raster information for the second frequency band.

30. The first wireless communication device of claim 17, wherein one of the first frequency band or the second frequency band is a normal downlink (NDL) frequency band, and the other one of the first frequency band or the second frequency band is a supplemental downlink (SDL) frequency band.

* * * * *